US006188857B1

(12) United States Patent
Yamanaka et al.

(10) Patent No.: US 6,188,857 B1
(45) Date of Patent: Feb. 13, 2001

(54) IMAGING FORMING APPARATUS PROVIDED WITH PHOTORECEPTOR UNIT WITH INTERNAL GEAR UNIT, THE PROTECTOR UNIT WITH INTERNAL GEAR, AND INTERNAL GEAR UNIT

(75) Inventors: Toshio Yamanaka, Yao; Yoshiharu Yoneda, Shijonawate; Yasuji Yamauchi; Yasuo Kitabatake, both of Nara; Hideaki Kadowaki, Yamatokoriyama; Yoshikazu Harada, Nara, all of (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/323,479

(22) Filed: Jun. 1, 1999

Related U.S. Application Data

(62) Division of application No. 08/613,056, filed on Mar. 7, 1996, now Pat. No. 5,927,148.

(30) Foreign Application Priority Data

Mar. 7, 1995 (JP) ........................ 7-047516
Mar. 8, 1995 (JP) ........................ 7-048576
Mar. 10, 1995 (JP) ........................ 7-051538

(51) Int. Cl.[7] .................. G03G 15/00; F16H 1/02
(52) U.S. Cl. .................. 399/167; 74/412 R; 399/116; 399/117
(58) Field of Search .................. 74/409, 410, 412 R, 74/413, 414, 415; 399/116, 117, 159, 167

(56) References Cited

U.S. PATENT DOCUMENTS 3,733,926 5/1973 Hope et al. .
3,966,316 6/1976 Pfeifer et al. .
4,935,778 6/1990 Mochida .
4,951,093 * 8/1990 Ishii et al. ..................... 399/167
5,136,330 8/1992 Sato .
5,210,574 * 5/1993 Kita ..................... 399/167
5,761,580 * 6/1998 Harada et al. ..................... 399/167

FOREIGN PATENT DOCUMENTS 4134105 4/1992 (DE) .
0272517 6/1988 (EP) .
58-120265 7/1983 (JP) .
61-155863 9/1986 (JP) .
61-203464 9/1986 (JP) .
239971 2/1990 (JP) .
3243972 10/1991 (JP) .

* cited by examiner

*Primary Examiner*—Arthur T. Grimley
*Assistant Examiner*—Hoang Ngo

(57) ABSTRACT

An image forming apparatus provided with a photoreceptor with an internal gear includes the internal gear in a photoreceptor drum, a pinion gear in engagement with the internal gear, and a cleaning unit and a developer unit which apply contact pressure onto the photoreceptor drum. The pinion gear is provided in such an area that a resulting force of the contact pressure respectively applied from the process elements does not cause a distortion of the photoreceptor drum which exceeds an axial backlash determined in initialization according to a distance between axes of the pinion gear and the internal gear. The described arrangement prevents interference between non-driving surfaces of the internal gear and the pinion gear. As a result, a smooth rotary motion of the photoreceptor drum can be ensured, thereby preventing an image defect caused by an unstable rotary motion of the photoreceptor drum.

9 Claims, 28 Drawing Sheets

IMAGING FORMING APPARATUS PROVIDED WITH PHOTORECEPTOR UNIT WITH INTERNAL GEAR UNIT, THE PROTECTOR UNIT WITH INTERNAL GEAR, AND INTERNAL GEAR UNIT

This application is a division of application Ser. No. 08/613,056 filed Mar. 7, 1996 is now U.S. Pat. No. 5,927, 148.

FIELD OF THE INVENTION

The present invention refers to an image forming apparatus such as a copying machine, a printer, etc., provided with a photoreceptor unit with an internal gear. The present invention also refers to a photoreceptor unit with an internal gear for a copying machine, a printer or other image forming apparatuses. The present invention further refers to an internal gear unit for such photoreceptor unit with an internal gear.

BACKGROUND OF THE INVENTION

There are known image forming apparatuses such as copying machines, etc., provided with a cylindrical photoreceptor drum 101 as shown in FIG. 22. In such image forming apparatuses, the surface of the photoreceptor drum 101 is charged by a main charger 102, and the photoreceptor drum 101 is exposed by projecting thereon a light beam from an exposure unit 103, and the resulting electrostatic latent image is developed by a developing unit 104, and is transferred to a sheet by a transfer charger 105. Thereafter, the charge on the surface of the photoreceptor drum 101 is removed by a cleaning blade (not shown) of a cleaning unit 106, and the developed image is permanently affixed onto the sheet by a fusing unit 107 (not shown). In the described image forming process, the photoreceptor drum 101 is driven by a drive unit so as to rotate in one direction.

In Japanese Unexamined Patent Publication No. 120265/1983 (Tokukaisho 58-120265) and Japanese Unexamined Utility Model Application No. 155863/1986 (Jitsukaisho 61-155863, there is shown a drive unit wherein the photoreceptor drum 101 provided with an internal gear is rotated by a drive gear having a small diameter in engagement with the internal gear (for simplicity, the term internal gear system is used herein) as an example of the drive system for the photoreceptor drum 101. The described arrangement is superior to the arrangement where the photoreceptor drum 101 is provided with an external gear in engagement with the drive gear in the following points. That is, as a greater number of teeth of the drive gear and the driven gear (internal gear) are in engagement with one another, unstable driving condition affected by the drive pitch of the gear is less likely to occur. Additionally, as the drive gear, etc., can be formed in the inside of the photoreceptor drum 101, the drive device can be made compact, and thus the miniaturization of the image forming apparatus can be achieved.

In the described arrangement, however, various process elements such as a main charger 102, an exposure unit 103, a developing unit 104, a transfer charger 105, a cleaning unit 106, etc., are provided along the circumference of the cylindrical photoreceptor drum 101, and among these process elements, the developing unit 104 and the cleaning blade of the cleaning unit 106 in tight contact with the photoreceptor drum 101 respectively apply contact pressure onto the photoreceptor drum 1. Therefore, the photoreceptor drum 101 is deformed to some extent which causes a displacement or decentering of the axis. On the other hand, as a greater number of teeth of the drive gear and the driven gear (internal gear) are in engagement with one another as described earlier, depending on the relative position between the process elements in tight contact with the photoreceptor drum 101 and the drive gear, the distortion in torque may occur, thereby presenting the problem that a smooth rotary motion of the internal gear, i.e., the photoreceptor drum 101 by the drive gear cannot be ensured. Such unstable rotary motion of the photoreceptor drum 101, if occurred, would cause a default image. Japanese Unexamined Patent Publication No. 120265/1983 (Tokukaisho 58-120265) and Japanese Unexamined Utility Model Application No. 155863/1986 (Jitsukaisho 61-155863) fail to provide the solution to such problem.

There are known photoreceptor units through Japanese Unexamined Utility Model Application No. 155863/1986 (Jitsukaisho 61-155863) and Japanese Unexamined Patent Publication No. 120265/1983 (Tokukaisho 58-120265). In Japanese Unexamined Utility Model Application No. 155863/1986 (Jitsukaisho 61-155863), there is shown a photoreceptor unit having arrangements illustrated in FIG. 23 and FIG. 24. As shown in these figures, around both ends of a photoreceptor drum 201, plural rollers 202 are provided for supporting the photoreceptor drum 201. On the inner circumference of the photoreceptor drum 201, formed is an internal gear unit 203, and a rotary motion of the photoreceptor drum 201 is actuated by a drive gear 205 in engagement with an internal gear member 204 of the internal gear unit 203.

In Japanese Unexamined Patent Publication No. 120265/1983 (Tokukaisho 58-120265), there is shown a photoreceptor unit having an arrangement shown in FIG. 25. As shown in the figure, an internal gear unit 302 is centrally situated on an inner circumference of a photoreceptor drum 301. With an internal gear member 303 of the internal gear unit 302, engaged is a gear 305 for a motor 304 which is formed in the inside of the photoreceptor drum 301.

The described conventional photoreceptor units have the following drawbacks. That is, the former photoreceptor unit requires a complicated structure for supporting a rotatable photoreceptor drum, and a smooth rotary motion of such photoreceptor drum is difficult to be ensured. On the other hand, the latter photoreceptor unit does not refer to the desirable structure of a support mechanism for the rotatable photoreceptor drum.

To solve the described problem, there has been proposed a photoreceptor unit shown in FIG. 26. The photoreceptor unit is arranged such that an internal gear unit 403 with an internal gear member 402 is fitted to the end of a photoreceptor drum 401. A rotary motion of the photoreceptor drum 401 is actuated by a drive system including a drive pinion gear 404.

The internal gear unit 403 includes a gear support member 405 formed on a face perpendicular to an axis of the photoreceptor drum 401 and a bearing member 406 centrally situated in the gear support member 405. An end portion 406*a* formed in an axial direction of the bearing member 406 is situated to the inside in an axial direction with respect to an end portion 402*a* of the internal gear member 402.

In the described arrangement, as the bearing member 406 is formed right below the internal gear member 402, the foreign substances such as powders generated by the abrasion of the internal gear member 402, etc., may drop and enter the bearing member 406, and the frictional resistance of the bearing member 406 increases, which may even damage the bearing member 406 itself. This may result in the problems of unstable rotary motion, shaking and locking of the photoreceptor drum 401 or an increase in load during a rotary motion thereof.

The internal unit 403 shown in FIG. 26 is arranged such that the length B of the teeth tip portion of the internal gear member 82 (402) (see an explanatory view of FIG. 20) is selected to be larger than the length A of the teeth bottom portion as shown in FIG. 20. For this reason, for example, the shrinkage at the portion of the length B delays in the cooling process in the resin manufacturing process. As a result, as shown in FIG. 27, the free end side of the internal gear member 402 formed perpendicular to the gear support member 405 may be deformed towards the center of the internal gear unit 403.

Such deformation occurs by the following mechanism. For example, in the case where a member which includes a thick ridge portion 502 centrally situated on a flat plate 501 is formed by an injection molding as shown in FIG. 28(*a*), in general, as the hardening process is delayed, the thick ridge portion 502 shrinks and is bent in the direction of an arrow in FIG. 28(*b*).

The maximum amount of deformation of the internal gear member 402 would be around 50–80 μm. This may lower the precision of the internal gear member 402, and the meshing error per pitch of 20 μm and a total meshing error of 60 μm would not be maintained within respective desirable ranges. Especially for the internal gear member 402, different from the normal flat gear, the meshing error exceeding the backlash, if occurred, would interfere the non-driving surface, and the described deformation may not be a serious problem.

Additionally, to solve such problem, the length A shown in FIG. 20 cannot be made larger in view of improving respective precision of the internal gear member 402 and the internal unit 403 in the direction of the diameter and in consideration of a possible shrinkage, etc.

SUMMARY OF THE INVENTION

A first object of the present invention is to provide an image forming apparatus provided with a photoreceptor drum with an internal gear wherein contact pressure is applied from process elements to a photoreceptor drum, and a drive force for actuating a rotary motion of the photoreceptor drum is transmitted to an internal gear provided in the photoreceptor drum, which permits an image defect caused by unstable rotary motion to be prevented by ensuring a smooth rotary motion of the photoreceptor drum.

A second object of the present invention is to provide a photoreceptor unit with an internal gear which permits problems caused by foreign substances entering a bearing member of an internal gear unit provided in a photoreceptor drum to be prevented, such as an increase in frictional resistance between the bearing member and a shaft, a damage of the bearing member which may cause unstable rotary motion, shaking and locking of the photoreceptor drum and an increase in load during the rotary motion of the photoreceptor drum.

A third object of the present invention is to provide an internal gear unit having a disk member formed at one end in a widthwise direction of an internal gear member, which permits the internal gear member of the internal gear unit from being deformed in the manufacturing process and an accurate meshing condition with the internal gear member to be maintained.

The first object is fulfilled by an image forming apparatus with a photoreceptor unit with an internal gear in accordance with the present invention which is characterized by including:

a photoreceptor drum having the internal gear for actuating a rotary motion thereof;

process elements for forming an image, provided along a circumference of the photoreceptor drum, the process elements respectively applying contact pressure onto the photoreceptor drum; and a pinion gear for transmitting a drive force, the pinion gear being in engagement with the internal gear, wherein the pinion gear is provided in such an area that a resulting force of the contact pressures respectively applied from the process elements does not cause a distortion of the photoreceptor drum which exceeds an axial backlash determined in initialization according to a distance between axes of the pinion gear and the internal gear.

According to the described arrangement, the pinion gear in engagement with the internal gear provided in the photoreceptor drum is provided in such an area that a resulting force of the contact pressure respectively applied from the process elements does not cause a distortion of the photoreceptor drum which exceeds an axial backlash determined in initialization according to a distance between axes of the pinion gear and the internal gear. Therefore, the respective non-driving faces of the internal gear and the pinion gear do not interfere with one another. As a result, a smooth rotary motion of the internal gear, i.e., the photoreceptor drum can be ensured, thereby preventing an image defect caused by an unstable rotary motion of the photoreceptor drum.

The second object of the present invention is fulfilled by a photoreceptor unit with an internal gear, which is characterized by including:

a photoreceptor drum; and an internal gear unit fitted in the photoreceptor drum, for actuating a rotary motion thereof;

wherein the internal gear unit includes:

an internal gear member;

a gear support member provided on a face perpendicular to an axial direction of the photoreceptor drum, for supporting the internal gear member; and a bearing member formed at a center of the gear support member, and the internal gear member and the bearing member are formed so as to be projected in an axial direction of the photoreceptor drum to an outside with respect to the gear support member, and an outer end portion in the axial direction of the bearing member extends in the axial direction to an outside with respect to the internal gear member.

According to the described arrangement, foreign substances such as dust generated by abrasion would drop on the outer circumferencial surface of the bearing member, whereby such foreign substances entering between the bearing member and the shaft can be prevented. As a result, an increase in frictional resistance between the shaft bearing and the shaft, the damage of the bearing and unstable rotations of the photoreceptor drum, shaking and locking of the photoreceptor drum, and an increase in load during the rotation of the photoreceptor drum can be prevented.

Since described effect can be achieved only by forming the bearing member so as to extend in the axial direction of the photoreceptor drum than the internal gear, the structure of the bearing member can be simplified.

The third object can be fulfilled by an internal gear unit of the present invention which is characterized by including:

a cylindrical internal gear member;

a disk member formed at one end portion in a widthwise direction of the cylindrical internal gear member; and a reinforcement member formed in a vicinity of an outer circumference of a face opposite to the side of the internal gear member of the disk member, for preventing a free end in the internal gear member from being deformed towards a center of the internal gear member, wherein the reinforcement member is formed in a cylindrical shape so as to be projected to an opposite direction to a forming direction of the internal gear member from the disk member, and that a projected leading end portion is formed thinner than an average thickness of the internal gear member.

According to the described arrangement, as the projected leading end of the reinforcement member is selected to be thinner than an average thickness of the internal gear member, in the hardening process in the forming process of the internal gear unit, the projected leading end will be hardened faster than the internal gear member. Additionally, as the internal gear member is selected to be thicker, the hardening would be delayed, and the internal gear unit would fall down toward the center of the internal gear unit by shrinkage.

Besides, as the connecting part of the internal gear member with the disk member is also made thick, the hardening process is further delayed. Therefore, in the connecting part, a concentrated stress is applied both from the internal gear side and the reinforcement part side by shrinkage during the hardening process. In this case, as to the internal gear side, a force exerted on the internal gear member so as to fall down to the center of the internal gear unit is cancelled out by the applied stress, thereby preventing the internal gear member from being deformed.

As to the reinforcement member, the described stress is exerted on the reinforcement member as a tensile stress. However, the projected leading end of the reinforcing member is already hardened, and the deformation of the leading end can be prevented. As described, as the reinforcing member serves as a projected member, the deformation of the internal gear member can be surely prevented.

For a fuller understanding of the nature and advantages of the invention, reference should be made to the ensuring detailed description taken in conjunction with the accompanying drawings.

BRIEF DESCRIPTION OF THE DRAWINGS

FIG. 28(*b*) is an explanatory view showing a state where the members shown in FIG. 28(*a*) are deformed.

DESCRIPTION OF THE EMBODIMENTS

The following will discuss one embodiment of the present invention in reference to FIG. 1 through FIG. 11.

Figure 2:
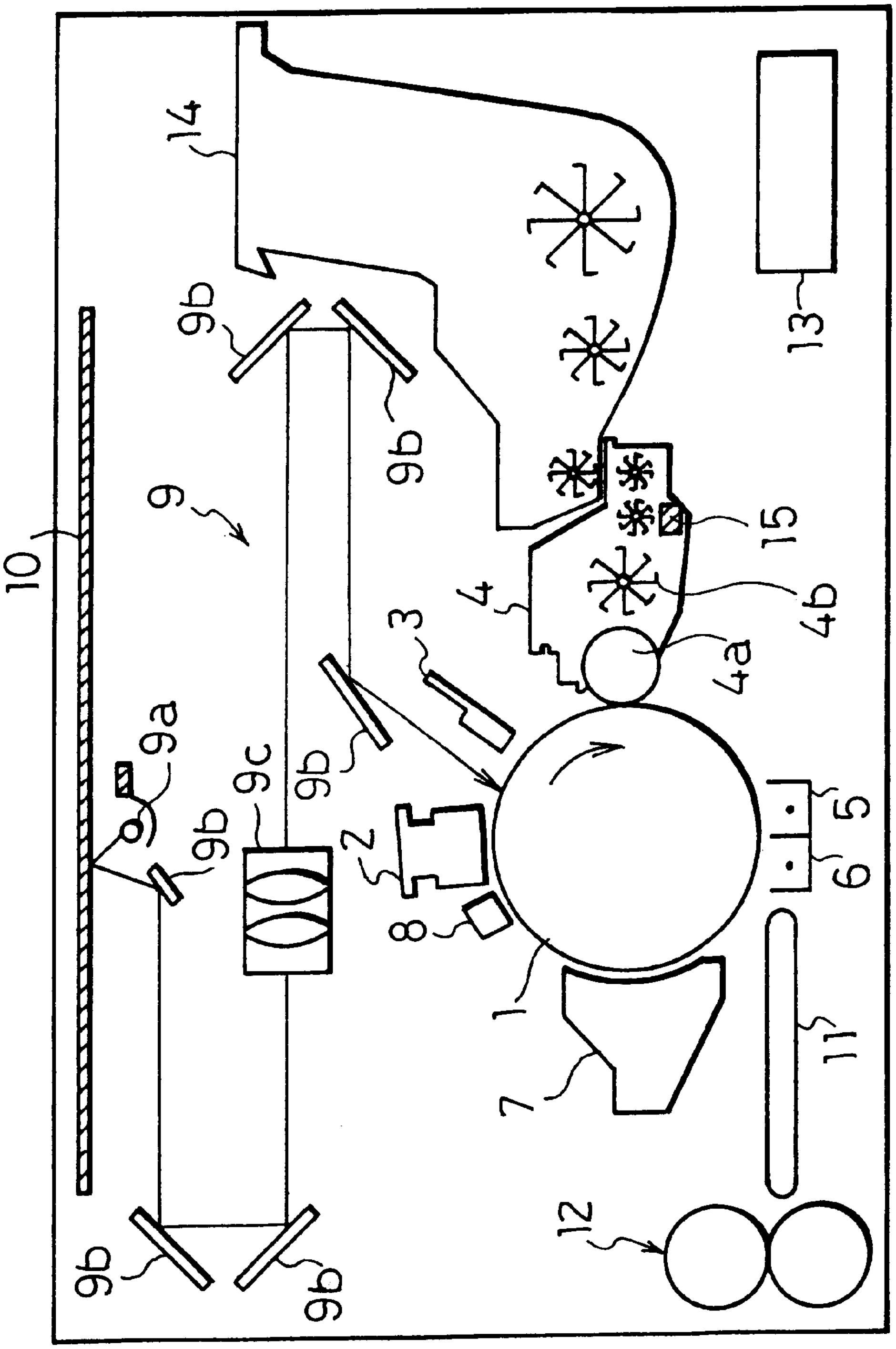
FIG. 2 is a view schematically showing an entire structure of the copying machine having the arrangement shown in FIG. 1.

As shown in FIG. 2, a copying machine (image forming apparatus) of the present embodiment includes therein a cylindrical photoreceptor drum 1. Along the circumference of the photoreceptor drum 1, provided are a main charger 2, a blank lamp 3, a developing unit 4, a transfer charger 5, a separating charger 6, a cleaning unit 7 and a removing lamp 8. Further, provided above the photoreceptor drum 1 is an exposing unit 9.

The exposing unit 9 includes an exposure lamp 9*a,* plural mirrors 9*b* and a lens 9*c.* On the exposing unit 9, mounted is a transparent document platen 10. The described copying machine also includes a transfer belt 11, a fixing unit 12 and a control unit 13.

In such copying machine, an image forming process is performed by scanning a document placed on the document platen 10 by the exposure lamp 9*a* of the exposing unit 9, and a reflected light is projected onto the photoreceptor drum 1 through the plural mirrors 9*b* and the lens 9*c.* Here, the photoreceptor drum 1 is charged to a predetermined level by the main charger 2, and rotates at a constant speed in a direction of an arrow in the figure. In such photoreceptor drum 1, the potential of the irradiated area with the reflected light is lowered, i.e., exposed, thereby forming an electrostatic latent image on the surface of the photoreceptor drum 1. Additionally, the charge is removed from the non-image area of the photoreceptor drum 1 by the light emitted from the black lamp 3.

The electrostatic latent image thus formed is developed using a developing material (toner) supplied from a developing roller 4*a* of the developing unit 4 to form a toner image. The toner used in the developing process is charged beforehand to an opposite potential to the photoreceptor drum 1. Further, the toner image is transferred to a sheet (not shown) by the transfer charger 5 to be supplied between the photoreceptor drum 1 and the transfer charger 5, and is separated from the surface of the photoreceptor drum 1 by the separating charger 6. The sheet is conveyed to the fixing unit 12 by the transfer belt 11 where the toner image is permanently affixed to the sheet.

The residual toner on the surface of the photoreceptor drum 1 remaining after the toner image is transferred is collected by the cleaning unit 7, and is removed by the removing lamp 8. In addition, toner is supplied to the developer unit 4 from a toner hopper 14. Such toner supplying process is carried out based on the detection by a toner concentration sensor 15 provided in the developing unit 4. The described image forming process is carried out under the control by a control unit 13.

The structure around the circumference of the photoreceptor drum 1 will be described in more detail in reference to FIG. 1.

The cleaning unit 7 wipes off the residual toner on the surface of the photoreceptor drum 1 remaining after the transfer by the cleaning blade 7*a* which is in tight contact with the surface of the photoreceptor drum 1, and the toner thus wiped off is collected in a prescribed waste toner container by a transport screw 7*b.* The removing lamp 8 emits light onto the photoreceptor drum 1 through a filter 16 for preventing the discharge lamp 8 from having toner adhered thereto. The main charger 2, the transfer charger 5 and the separating charger 6 are all corona chargers which do not contact the photoreceptor drum 1. On the side of feeding a sheet between the photoreceptor drum 1 and the transfer charger 5, a paper stop roller 17 is provided for adjusting a timing of feeding a sheet. Specifically, a sheet is separated from the photoreceptor drum 1 by the separating charger 6 and a separating member 18.

Figure 3:
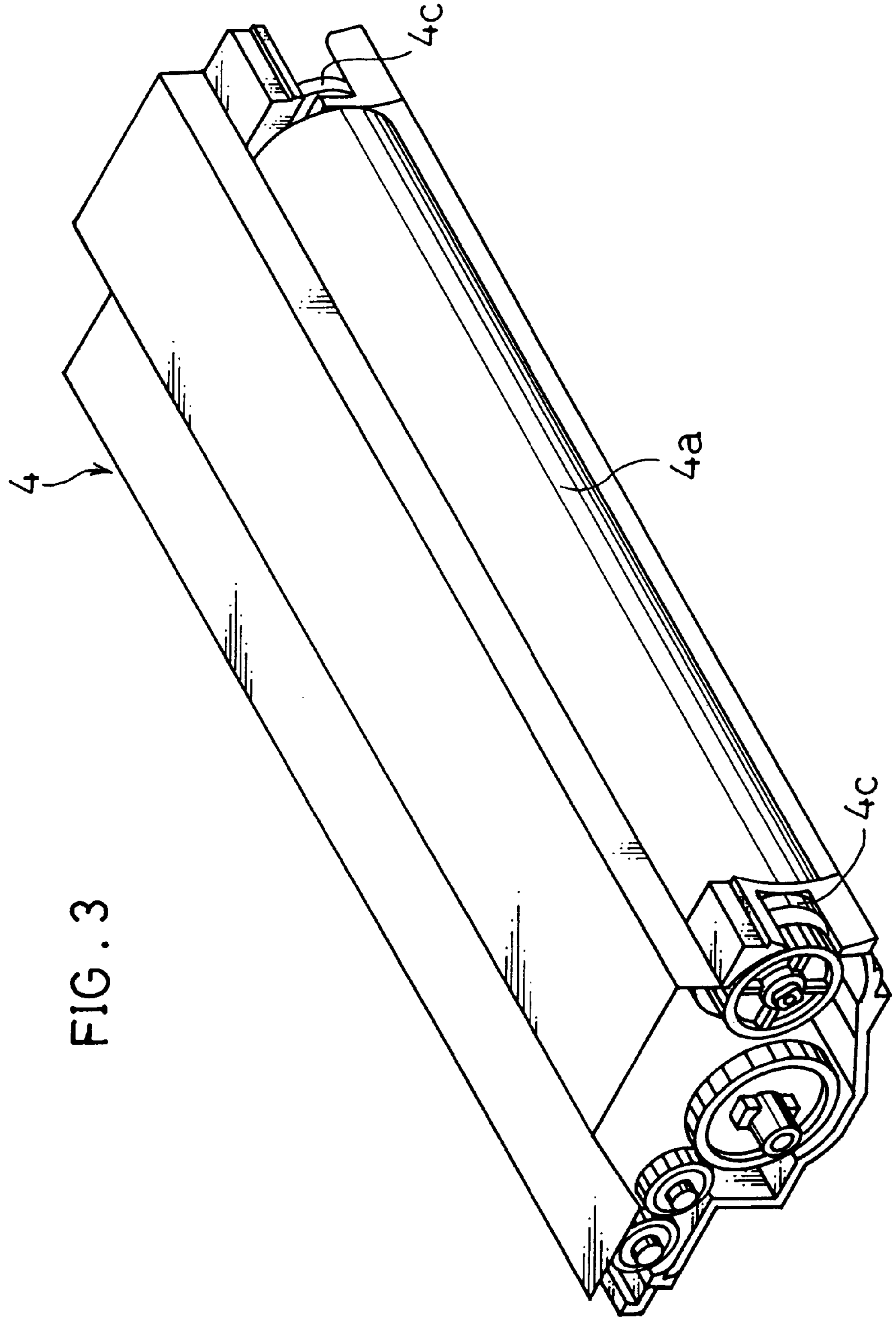
FIG. 3 is a perspective view of a developer unit shown in FIG. 1.
Figure 4:
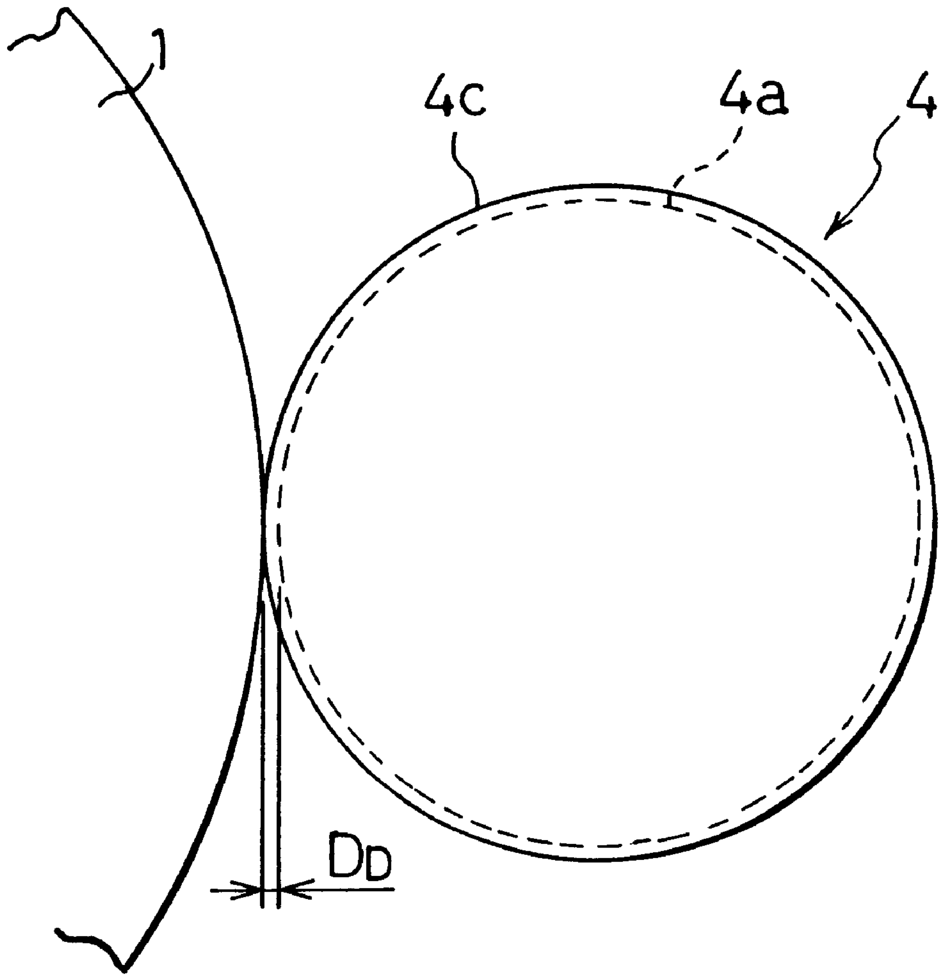
FIG. 4 is an explanatory view showing a state where the developer unit is made in tight contact with the photoreceptor drum by a DSD color shown in FIG. 3.

As shown in FIG. 3, the developer unit 4 is provided with disk-shaped DSD (Drum Sleeve Distance) collars 4*c* at both ends of the developer rollers 4*a.* As shown in FIG. 4, the DSD collars 4*c* are in tight contact with the photoreceptor drum 1. The diameter of the DSD colors 4*c* is selected to be insignificantly larger than the developer roller 4*a.* According to the described arrangement, there formed is a small clearance $D_D$ between the photoreceptor drum 1 and the sleeve which constitutes the circumference of the developer roller 4*a.*

Figure 5:
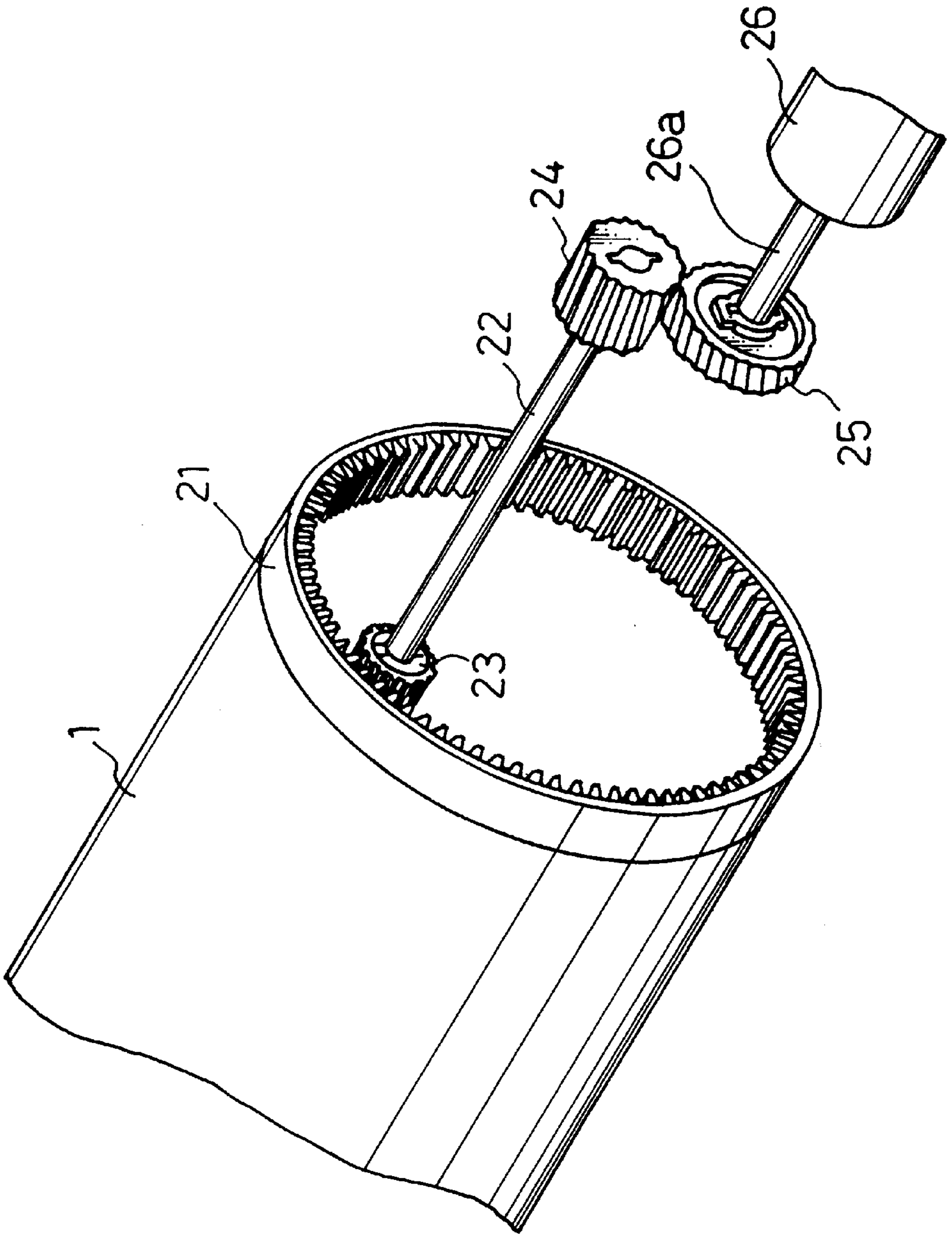
FIG. 5 is a perspective view showing a rotation drive mechanism of the photoreceptor drum shown in FIG. 1.

As shown in FIG. 5, an internal gear 21 is formed at one end along the inner circumference of the photoreceptor drum 1. In the present embodiment, such internal gear 21 made of resin serves as a flange portion formed at the end portion of the photoreceptor drum 1. The described internal gear 21 is in engagement with a pinion gear 23 mounted on one end of a rotation shaft 22. A gear 24 is mounted on the other end of the rotation shaft 22, and the gear 24 is in engagement with the gear 25 mounted on a drive shaft 26*a* of a drive motor 26.

In the copying machine of the present embodiment, members which are in tight contact with the photoreceptor drum 1 are the cleaning blade 7*a* of the cleaning unit 7 and the DSD collars 4*c* of the developer unit 4. As shown in FIG. 1, when the contact pressure exerted from the cleaning blade 7*a* onto the photoreceptor drum 1 is designated as $F_c$, the contact force exerted from the DSD collar 4*c* onto the photoreceptor drum 1 is $F_D$, and a resultant force of these contact pressure is designated as $F_o$, the pinion gear 23 is provided in a position perpendicular to the direction of the resultant force $F_o$.

In the copying machine having the described arrangement of the present embodiment, a drive force from the drive motor 26 shown in FIG. 5 is transmitted to the drive shaft 26*a,* the gear 25, the gear 24, the rotation shaft 22 and the pinion gear 23. As a result, the internal gear 21, i.e., the photoreceptor drum 1 is rotated by the pinion gear 23 which rotates at a predetermined position. Here, as the pinion gear 23 is provided in the position perpendicular to the direction of the resultant forces $F_o$ of the contact pressure $F_c$ applied from the cleaning blade 7*a* and the contact pressure $F_D$ from the DSD color 4*c* to the photoreceptor drum 1, the photoreceptor drum 1 can smoothly rotate. The described effect can be achieved for the following reason.

Figure 6:
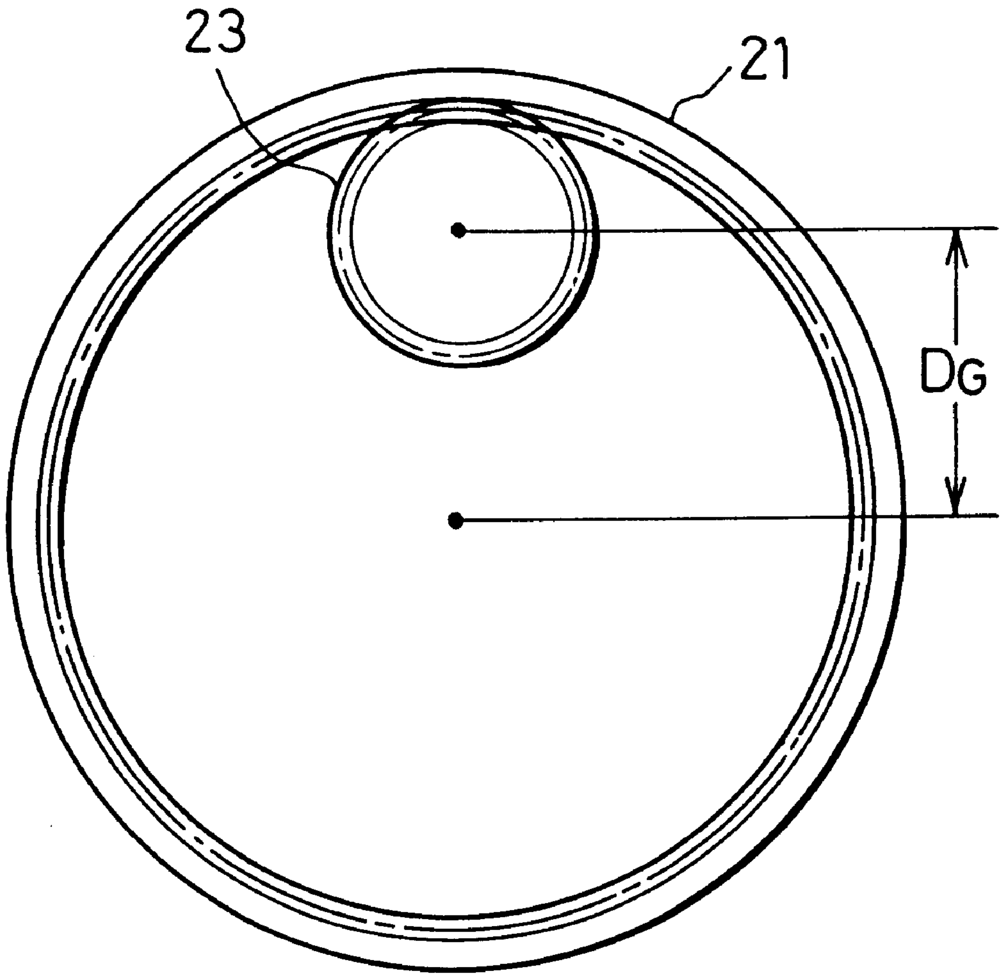
FIG. 6 is an explanatory view showing a distance $D_G$ between axes of an internal gear and a pinion gear shown in FIG. 1.

In general, the driving mechanism by the gear is arranged such that the center distance $D_G$ between the gears shown in FIG. 6 is determined so as to keep the distance of around from 10 to 20 percent of the gear module for an axial backlash. This distance generally refers to as an axial backlash. Namely, the distance $D_G'$ between shafts on theory is determined by the following formula:

$$D_G' = m \times (n_1 + n_2)/2$$

wherein the module is m, the number of teeth of the first gear (pinion gear 23) in engagement with one another is $n_1$, and the number of teeth of the second gear (internal gear 21) is $n_2$.

In contrast, the center distance $D_G$ on the design is determined by the following formula:

$$G_G = m \times (n_1 + n_2)/2 -- A$$

wherein the axial backlash A is around from 10 percent to 20 percent of m.

Figure 7:
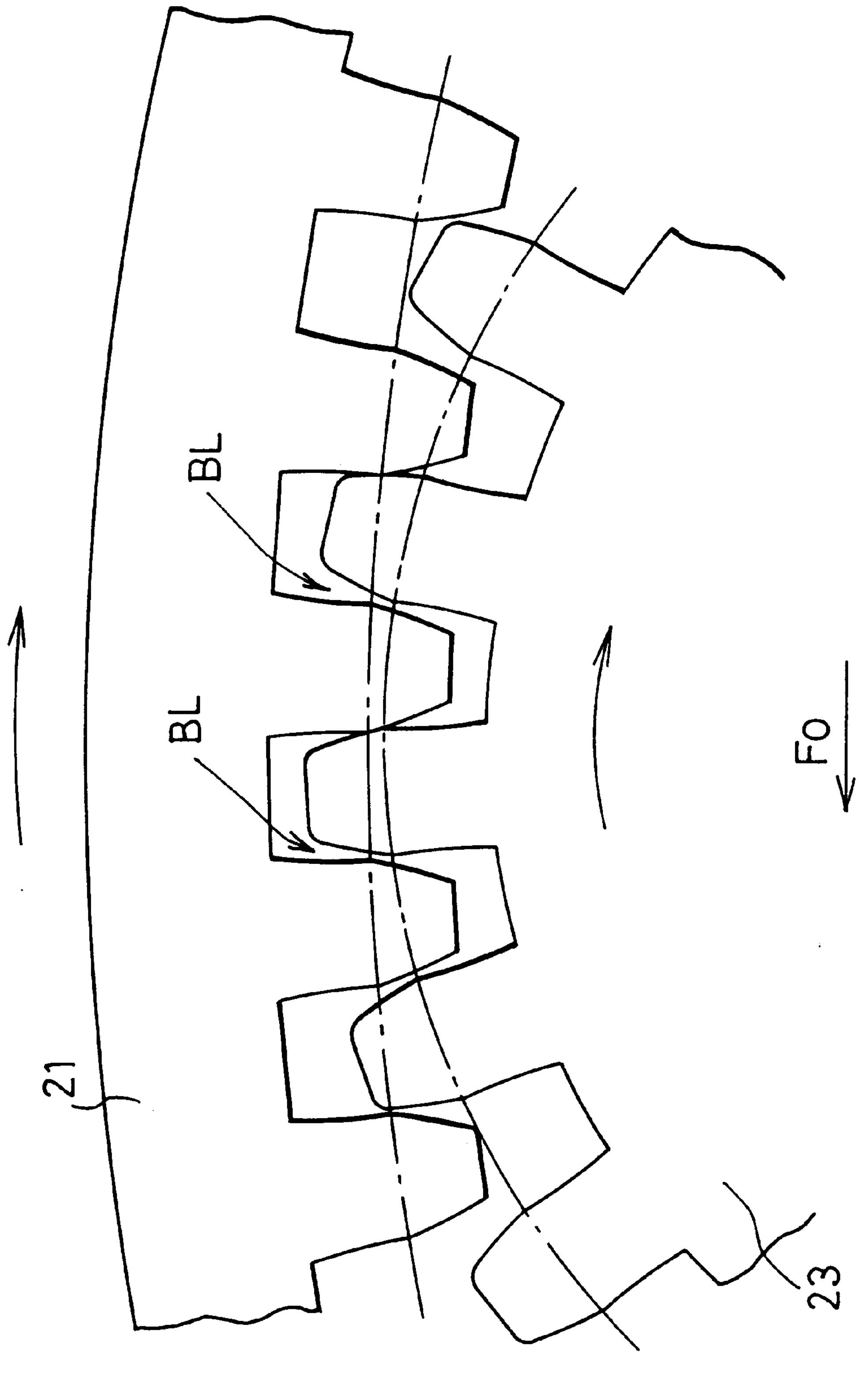
FIG. 7 is an explanatory view showing a state where the internal gear and the pinion gear are properly in mesh.

As described in the driving system having applied thereto the axial backlash, if the center distance $D_G$ did not vary by a distortion, etc., due to external force, as shown in FIG. 7, an appropriate minimum backlash, i.e., the backlash BL is ensured between teeth of the gear on an opposite side of the rotating direction shown by an arrow of the internal gear 21 and the pinion gear 23. By the backlash BL, a smooth engagement between the pinion gear 23 and the internal gear 21 can be achieved, thereby achieving a smooth rotary motion of the internal gear 21.

Figure 1:
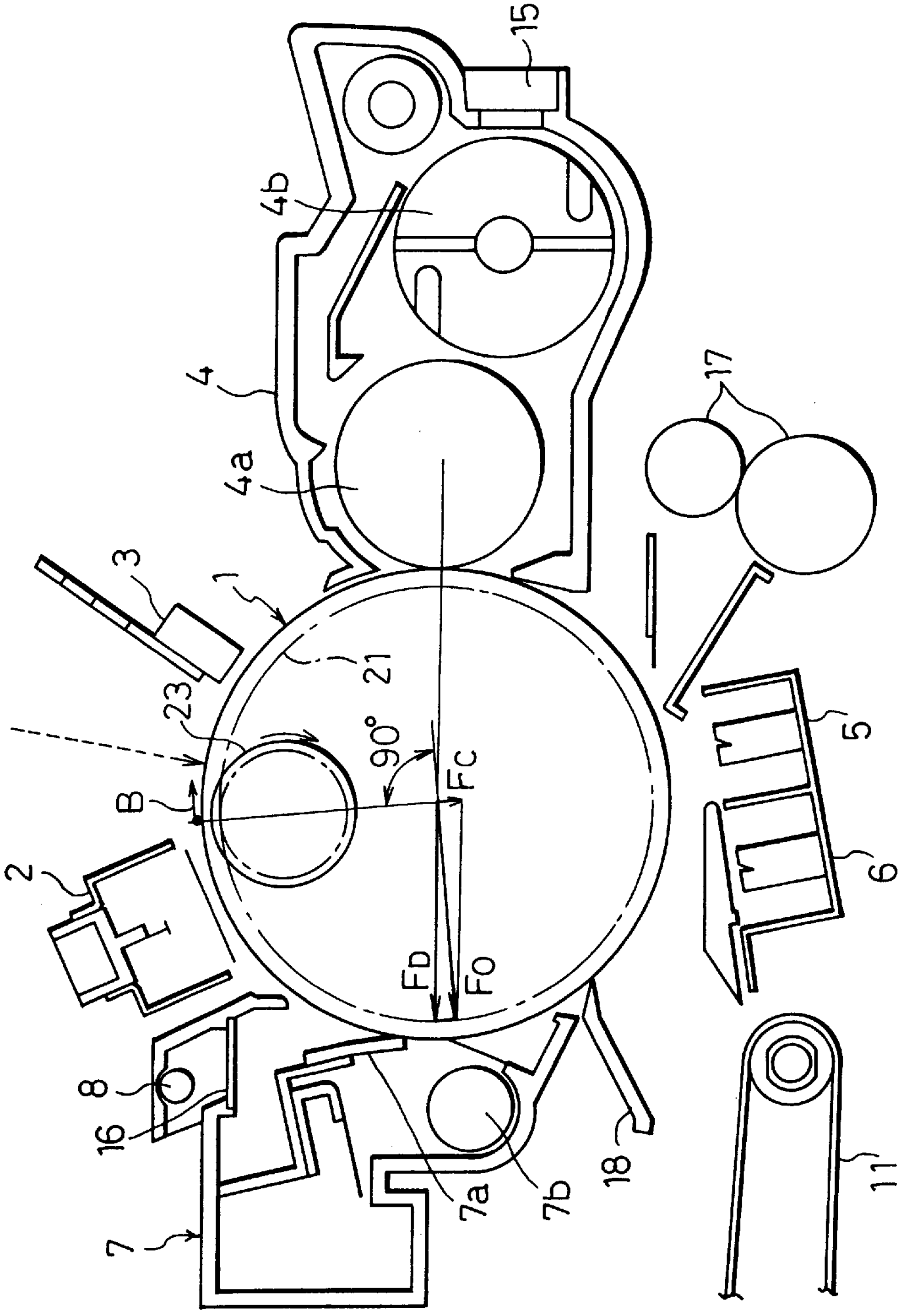
FIG. 1 which shows one embodiment of the present invention is a front view schematically illustrating a structure around a photoreceptor drum of a copying machine as an image forming apparatus.
Figure 8:
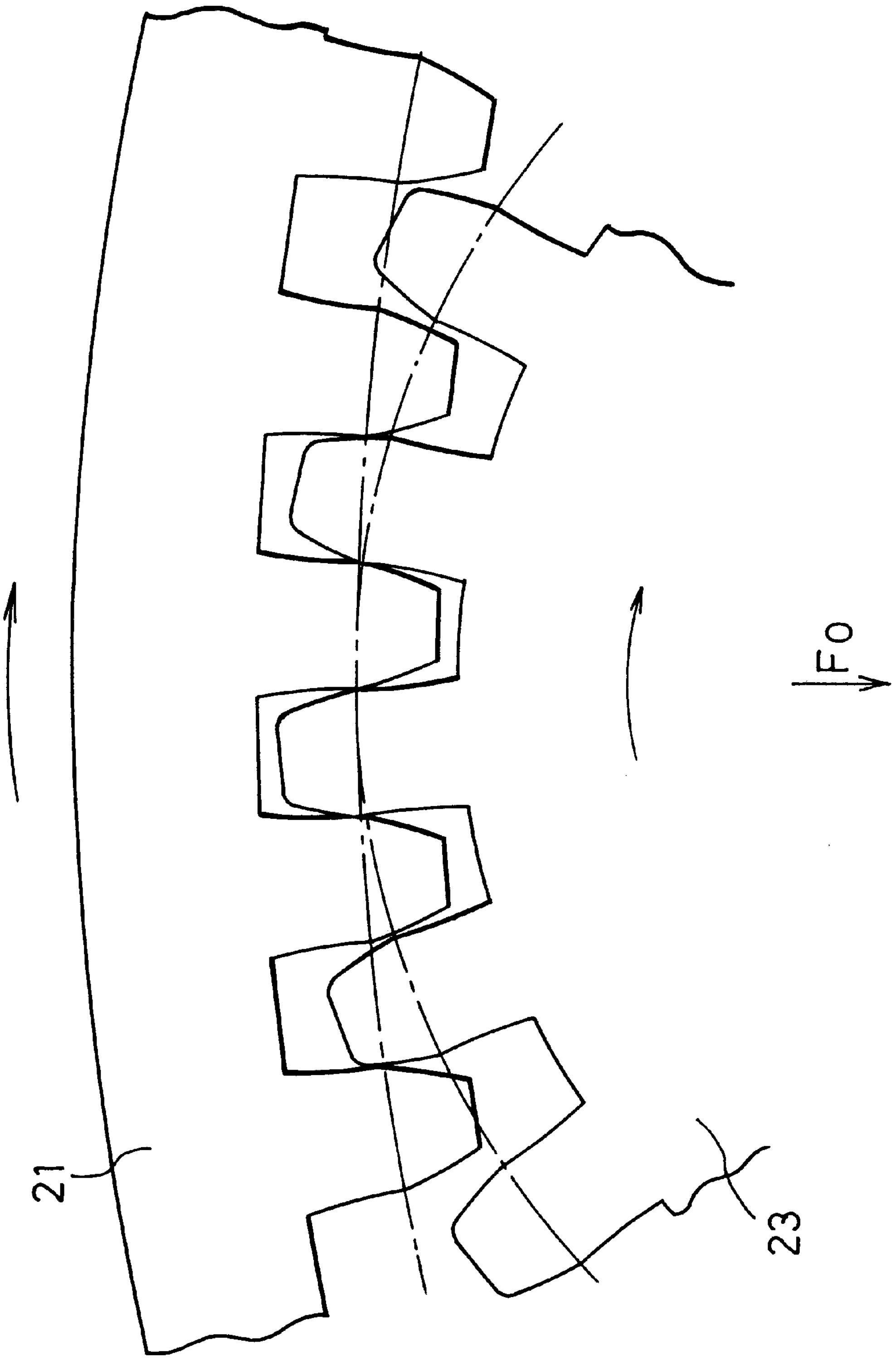
FIG. 8 is an explanatory view showing a state where the internal gear and the pinion gear shown in FIG. 1 are in engagement without a backlash.

In the arrangement shown in FIG. 1, if the pinion gear 23 was provided in a direction opposite to the direction of the resultant force $F_o$, the center distance $D_G$ would vary due to the resultant force $F_o$. Specifically, the distance $D_G$ varies in a direction of expanding the center distance $D_G$, i.e., the direction of making the backlash smaller. Therefore, in this case, as shown in FIG. 8, the backlash disappears, and the non-driven surfaces of the internal gear 21 and the pinion gear 23 contact one another, and a smooth rotary motion of the internal gear 21, i.e., the photoreceptor drum 1 cannot be ensured, thereby forming a default image such as non-uniform pitch, etc., by an unstable rotary motion of the photoreceptor drum 1.

As shown in FIG. 1, when the pinion gear 23 is provided in a direction perpendicular to the direction of the resultant force $F_o$, the center distance $D_G$ hardly varies in response to a shift of the photoreceptor drum 1 in the direction of the resultant force $F_o$. Therefore, as shown in FIG. 7, the backlash BL can be maintained, thereby ensuring a smooth rotary motion of the internal gear 21, i.e., the photoreceptor drum 1. As a result, the default image due to unstable rotations of the photoreceptor drum 1 can be prevented.

In the present embodiment, the pinion gear 23 is provided in the direction perpendicular to the direction of the resultant force $F_o$. This is an optimal position in view of positioning the pinion gear 23. Namely, other than the described position, there is an area where the pinion gear 23 can be placed without hindering a smooth rotary motion of the photoreceptor drum 1 due to a shift of the photoreceptor drum 1. Such area will be explained in the following.

First, the largest possible area where the pinion gear 23 can be placed would be the area $E_o$ where a distortion exceeding the axial backlash (the axial backlash A) predetermined in an initialization does not occur. Namely, when the pinion gear 23 is placed in the area where the resultant force $F_o$ would cause a distortion exceeding the axial backlash, the non-driving faces of the internal gear 21 and the pinion gear 23 contact with one another as shown in FIG. 8.

In contrast, as described, in the case where the pinion gear 23 is placed in a direction opposite to the direction of the resultant force $F_o$, the axial backlash would disappear, and the non-drive faces of the internal gear 21 and the pinion gear 23 would interfere with one another. Therefore, when the area formed in a direction opposite to the direction of the resultant force $F_o$ is denoted as En, in the area $E_1$ other than the area En, the axial backlash can be ensured irrespectively of the applied resultant forces $F_o$, thereby permitting the placement of the pinion gear 23. These areas En and $E_1$, for example, have the ranges shown in FIG. 9.

Figure 9:
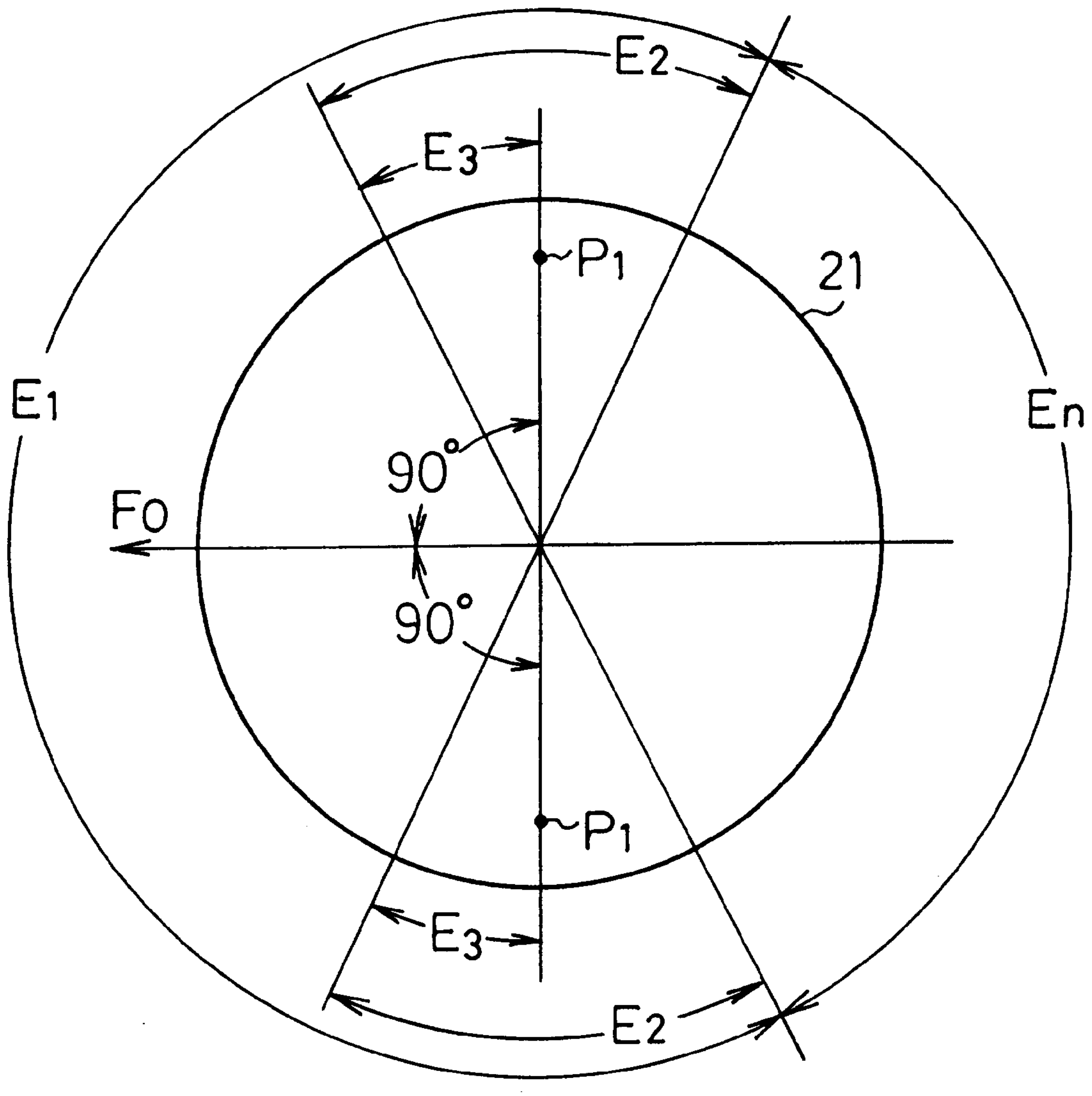
FIG. 9 is an explanatory view showing an area where the pinion gear can be installed in the copying machine shown in FIG. 1.

The optimal positions for the pinion gear 23 shown in FIG. 1 of the present embodiment are two positions $P_1 \cdot P_1$ shown in FIG. 9. The predetermined areas $E_2 \cdot E_2$ formed respectively around the positions $P_1 \cdot P_2$ are also almost free from a change in the center distance $D_G$ in response to the resultant force $F_o$.

When the area in the internal gear 21 is divided into four areas: the first area, the center of the first area being in the direction of the resultant force $F_o$, i.e., the area (area E1—areas $E_2 \cdot E_2$), the second and third areas, the respective centers thereof being in directions perpendicular to the direction of resultant force $F_o$, i.e., the areas $E_2 \cdot E_2$, and the fourth area, the center thereof being in an opposite direction to the resultant force $F_o$, i.e., the area En and the described areas $E_2 \cdot E_2$ would be the second and third areas. Here, the areas $E_2$ are formed on opposite sides in 30 degree angles respectively around the positions P.

In an area of the resultant force $F_o$, formed in the area $E_1$, the wheel distance $D_G$ is expanded in response to a shift of the photoreceptor drum 1. As this increases the backlash, although the non-driving surfaces do not interfere with one another, i.e., the rotary motion of the photoreceptor drum 1 would not be hindered, as the height of the teeth of the internal gear 21 and the pinion gear 23 in engagement with one another would be reduced, thereby increasing abrasion of both gears 21 and 23.

Namely, the meshing height of the gears with a module m would be 2 m on theory. Further, when 10 to 20 percent of additional axial backlash exits, the meshing height of the gears would be in a range of 1.8–1.9 m. In the case of the copying machine, around 80 percent of the meshing height of gears on theory would be required, i.e., at least 1.6 m. On the other hand, if the meshing height is above the described range, the above-mentioned unfavorable conditioned would occur.

For the reason set forth above, the axial backlash is preferably in a range of (1.8 to 1.9 m)−1.6 m=0.2 to 0.3 m, i.e., not more than 0.3 m. For this reason, within the area $E_1$, an area excluding an area formed in the direction of the resultant force $F_o$ is especially preferable. Such area correspond to the areas $E_2 \cdot E_2$.

In the area $E_2$, the axial backlash is reduced in an area formed in the direction opposite to the resultant force $F_o$ with respect to an origin of the position $P_1$. On the other hand, the backlash is increased in the area $E_3$ formed in the direction of the resultant force $F_o$ with respect to an origin of $P_1$. Therefore, it is especially preferable to place the pinion gear 23 in the area $E_3$ in the area $E_2$ as the interference between the non-drive forces of the internal gear 21 and the pinion gear 23 can be surely prevented.

Figure 10:
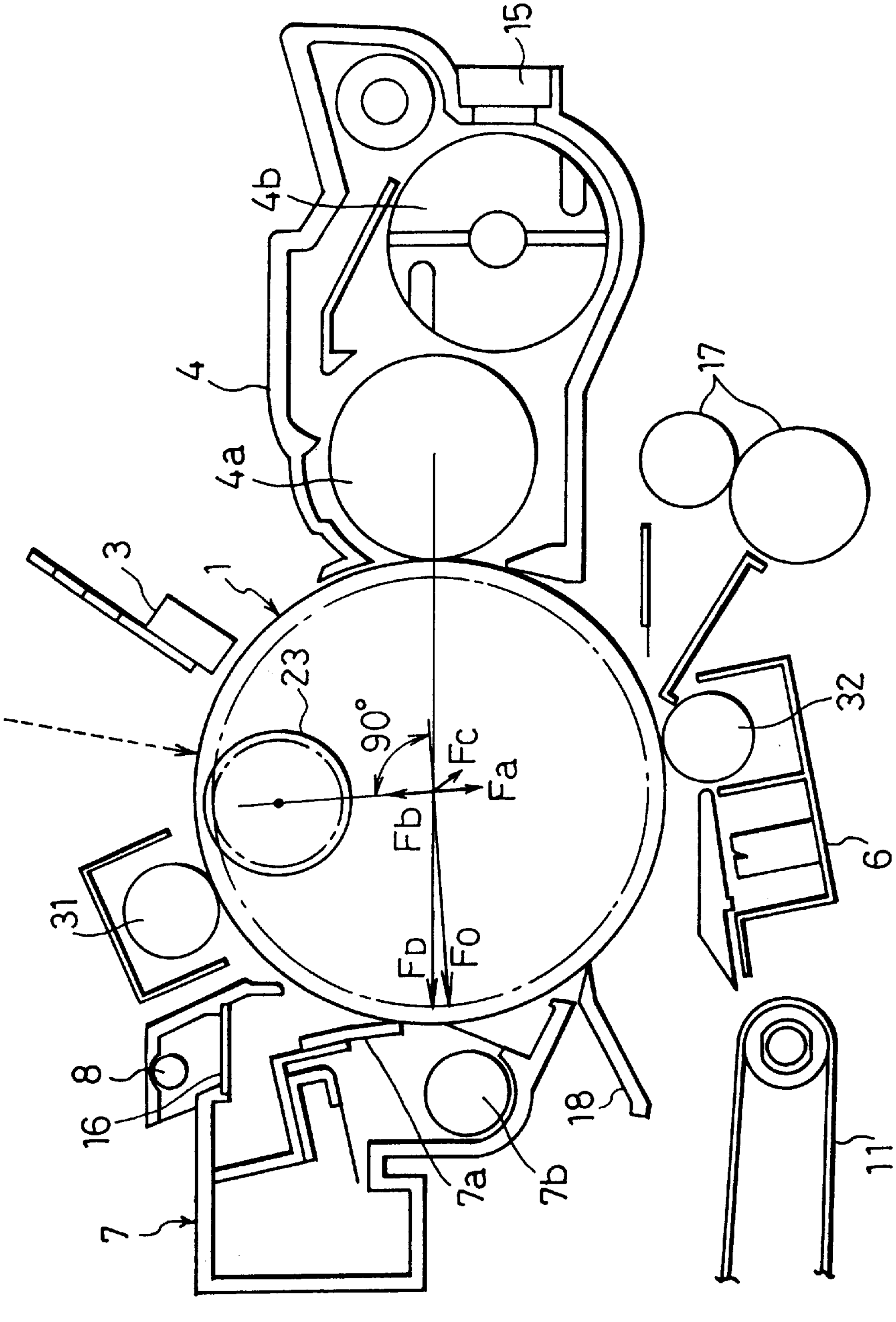
FIG. 10 which shows another embodiment of the present invention is a front view schematically showing a structure around a photoreceptor drum.

In the case where the main charger 2 and the transfer charger 5 shown in FIG. 1 are provided as the main charge roller 31 and the separating roller 32 in contact with the photoreceptor drum 1 as shown in FIG. 10, the contact pressure applied from these members should be taken into consideration as well as the contact pressure $F_c$ applied from the cleaning blade 7*a* and the contact pressure $F_D$ applied from the DSD collars 4*c*. Namely, when the contact pressure applied from the main charge roller 31 and the contact force with pressure applied from the separating roller 32 are respectively denoted as Fa and Fb, the pinion gear 23 is provided, for example, in an optimal position shown in the figure, with respect to the direction of the resultant force $F_o$.

Figure 11:
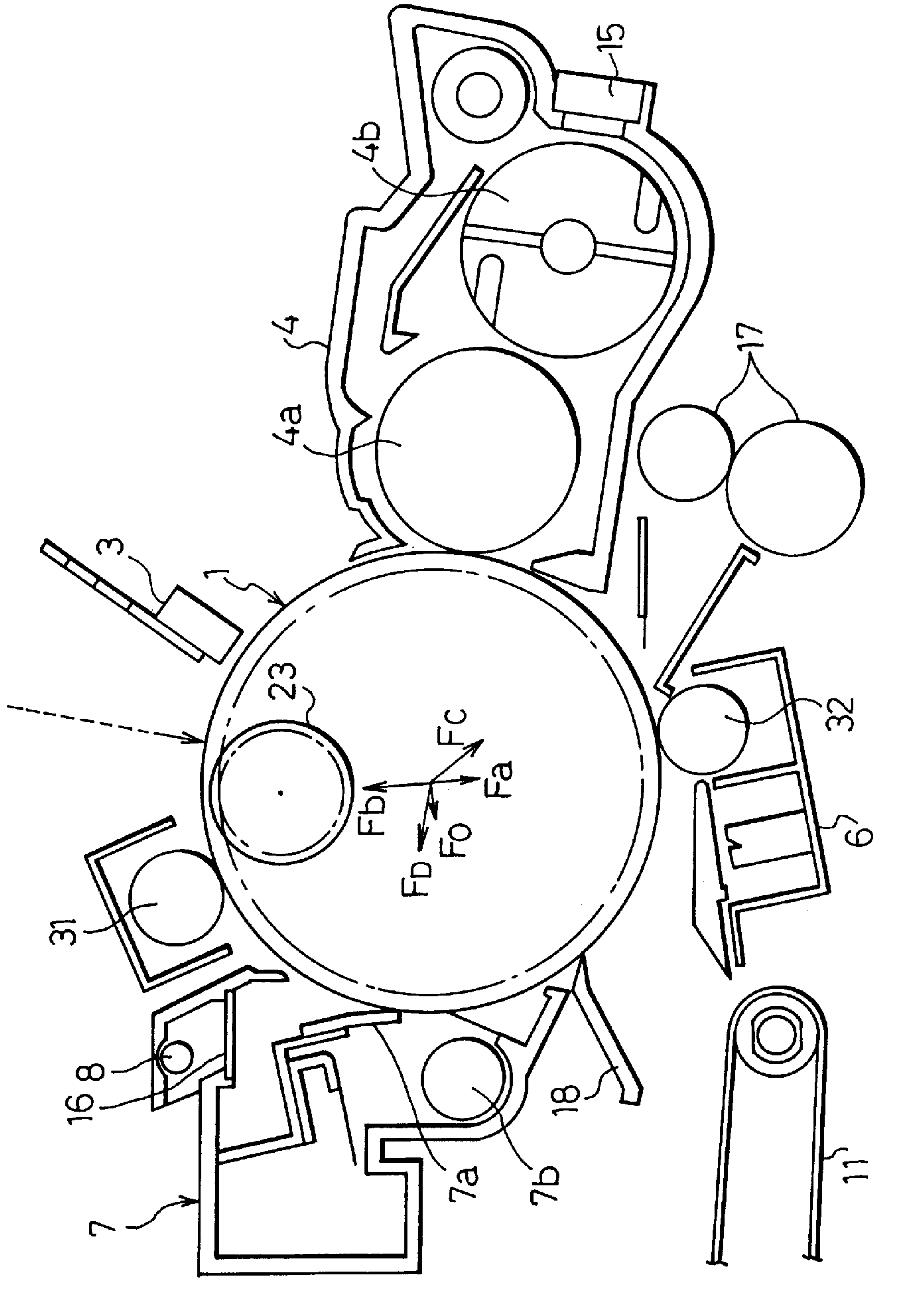
FIG. 11 is a front view schematically illustrating another structure around the photoreceptor drum of FIG. 10.

In the described arrangement, the position of the pinion gear 23 is determined based on the direction of the resultant force $F_o$. In a modification of the device according to the invention, the respective process elements may be provided so as to be in tight contact with the photoreceptor drum 1 so that the resultant force $F_o$ is minimized. The arrangement of such modification is illustrated in FIG. 11. Specifically, in such arrangement, the contact pressure $F_D$ is smaller as compared to the arrangements shown in FIG. 1 and FIG. 10. Here, the resultant force $F_o$ is minimized mainly by mounting the developing unit 4 closer to the separating roller 32. Such arrangement is especially effective in an other arrangement from the described area where the developing device 4 which applies relatively large contact pressure is not in tight contact with the photoreceptor drum 1 as the resultant force $F_o$ can approximate to zero.

The load during the rotary motion of the photoreceptor drum 1 is small as compared to the contact pressure respectively applied from the process elements such as the DSD collars 4c, the cleaning blade 7a. Therefore, the vector of shift in position of the photoreceptor drum 1 shown by the code B in FIG. 1 due to the load in the rotary motion of the photoreceptor drum 1 can be ignored.

Another embodiment of the present invention will be explained in reference to FIG. 12 through FIG. 14. For convenience in explanations, members having the same function as the aforementioned embodiment will be designated by the same reference numerals, and thus the descriptions thereof shall be omitted here.

Figure 12:
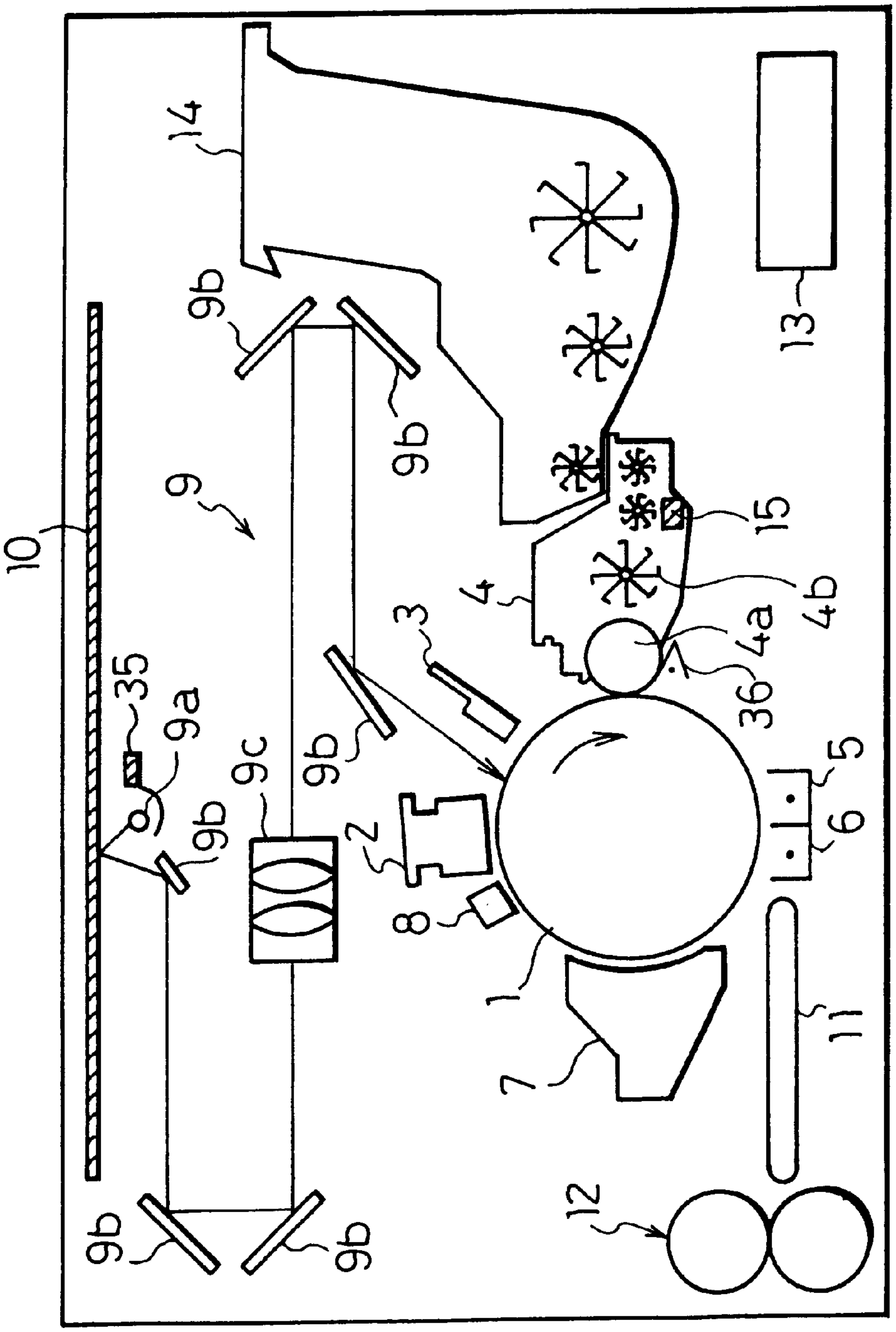
FIG. 12 which shows another embodiment of the present invention is a view showing an entire structure of a copying machine provided with a photoreceptor unit.

A copying machine provided with a photoreceptor unit 1 of the present embodiment has the arrangement illustrated in FIG. 12. Namely, the copying machine in accordance with the present embodiment is different from that of FIG. 2 in that an automatic exposure sensor 35 is provided in an exposing unit 9, and a pre-transfer charger 36 is provided along the circumference of the photoreceptor drum 1. Prior to the transfer charger 5, the pre-transfer charger 36 applies a charge to the photoreceptor drum 1 beforehand so that a toner image can be transferred to the photoreceptor drum 1 with ease.

Figure 13:
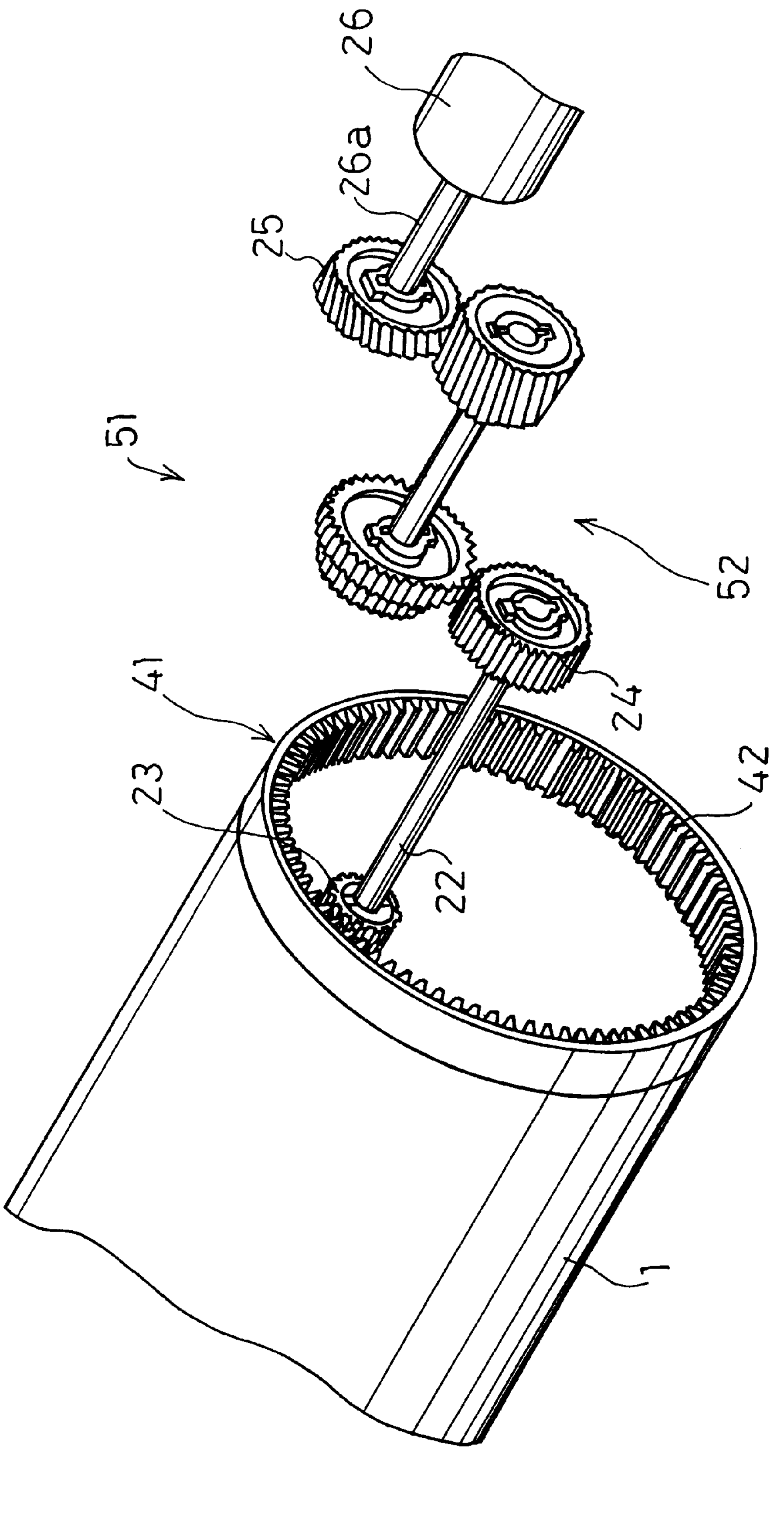
FIG. 13 is a perspective view showing a drive system of the photoreceptor unit in the copying machine shown in FIG. 12.

As shown in FIG. 13, an internal gear unit 41 is formed so as to be fitted in or adhere to the inner circumference of the photoreceptor drum 1 by press fitting. The internal gear unit 41 actuates a rotary motion of the photoreceptor drum 1 by a drive force transmitted from the drive unit 51. The photoreceptor unit of the present embodiment is composed of the described photoreceptor drum 1, the internal gear unit 41 and the drive unit 51.

The drive unit 51 is composed of a drive pinion gear 23 in engagement with an internal gear member 42 of the internal gear unit 41 and a drive force transmission-use gear system 52 linked to the pinion gear 23 and the drive motor 26.

Figure 14:
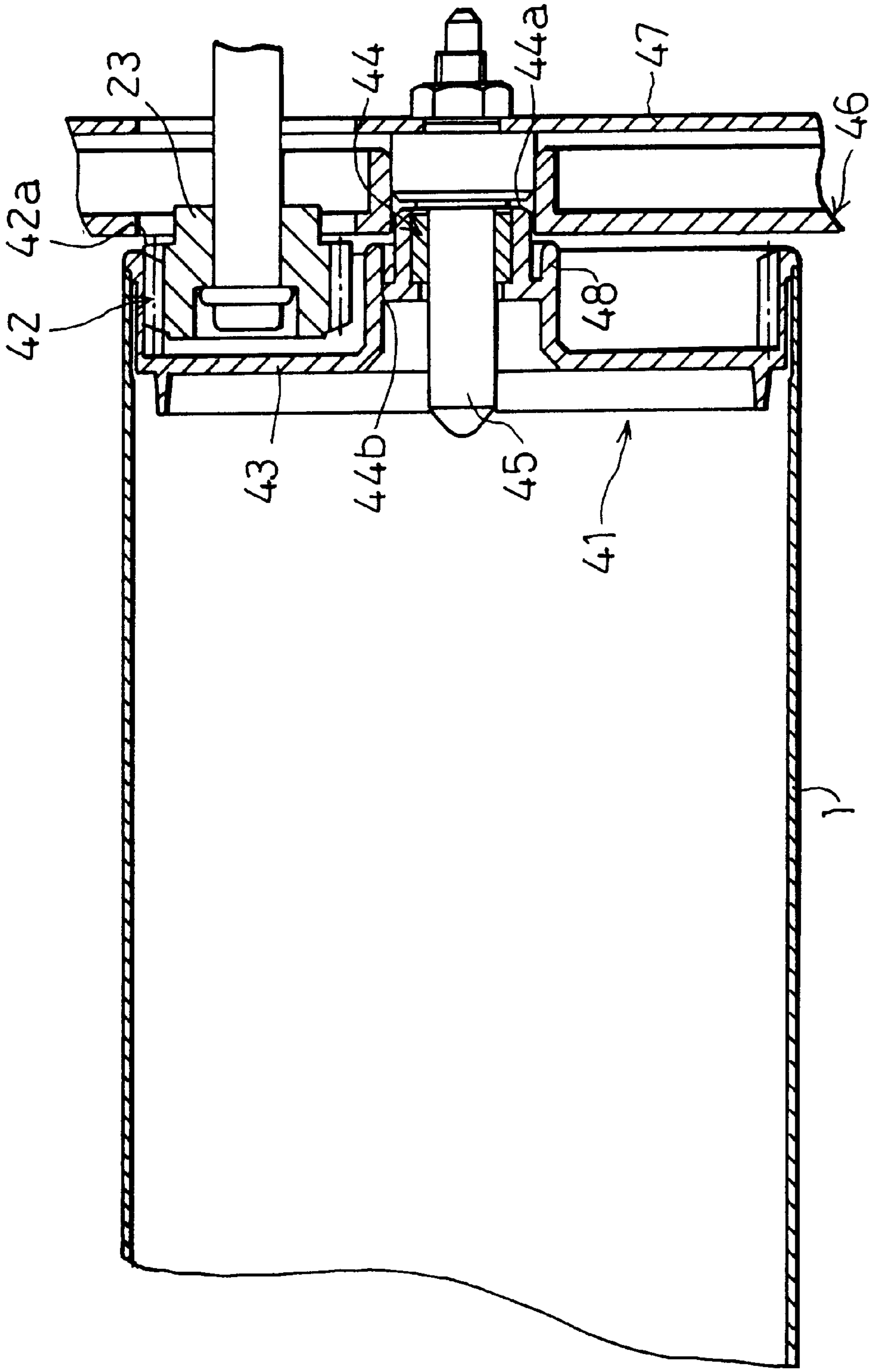
FIG. 14 is a cross-sectional view showing a structure of the photoreceptor unit in the copying machine shown in FIG. 12.

As shown in FIG. 14, the internal gear unit 41 is composed of an internal gear member 42, an internal gear support member 43, and a bearing member 44. The internal gear support member 43 for supporting the internal gear member 42 is formed on a face vertical to the shaft of the photoreceptor drum 1. The shaft bearing 44 is centrally situated in the gear support member 43.

The internal gear member 42 and the shaft bearing 44 are outwardly projected in the shaft direction of the photoreceptor drum 1 to the outside with respect to the gear support member 43. The outer end portion 44a in the shaft direction of the bearing member 44 extends in the shaft direction further to the outside with respect to the outer end portion 42a of the internal gear member 42.

In the bearing member 44, a shaft 45 for supporting the photoreceptor drum 1 is fitted. Such shaft 45 is supported by the process frame 46 which serves as a drum shaft supporting member. Further, the shaft 45 is fixed to the main body frame 47 which serves as a drive shaft bearing member of the copying machine main body. The process frame 46 is fixed to the main body frame 47. The process frame 46 and the main body frame 47 are situated to the outside with respect to the internal gear unit 41 in the shaft direction of the photoreceptor drum 1. In the present embodiment, a positioning member 48 is formed for the positioning of the process frame 46 in the shaft direction and for preventing it from shaking. The positioning member 48 is formed to the outside with respect to the bearing member 44 in the direction of the diameter to the outside in the shaft direction with respect to the gear support member 43.

According to the photoreceptor unit having the described arrangement, upon actuating the drive motor 26, a drive force is transmitted therefrom to the internal gear member 42 of the internal gear unit 41 via the drive force transmission-use gear system 52 and the pinion gear 23. As a result, a rotary motion of the photoreceptor drum 1 about the shaft 45 is actuated.

With regard to the rotary motion of the photoreceptor drum 1, there exist such problem that grease, etc., drops, or toner on the surface of the photoreceptor drum drops. However, the outer end portion 44a in the shaft direction of the bearing member 44 in the internal gear unit 41 extends to the outside in the shaft direction with respect to the internal gear member 42. Therefore, these foreign substances would drop only on the peripheral wall 44b of the bearing member 44, and would not enter a space between the bearing member 44 and the shaft 45.

As a result, an increase in a frictional resistance between the bearing member 44 and the shaft 45 due to foreign substances entering therebetween which would damage the bearing member 44 can be prevented. Additionally, an unstable rotary motion of the photoreceptor drum 1, the shaking and locking thereof, or an increase in load during its rotations caused by the damage of the bearing member 44 can be prevented.

In addition, the described effect can be achieved by a simple arrangement where the shaft bearing 44 extends in the shaft direction to the outside with respect to the internal gear member 42.

In the embodiment, to achieve the described effect, the internal gear member 42 and the bearing member 44 are projected in the shaft direction to the outside with respect to the gear support member 43. However, needless to say, the bearing member 44 which is projected to the inside with respect to the gear support member 43 can be employed as well.

A still another embodiment of the present embodiment will be explained in reference to FIG. 15 and FIG. 16. For convenience in explanations, members having the same function as the aforementioned embodiment will be designated by the same reference numerals, and thus the descriptions thereof shall be omitted here.

Figure 15:
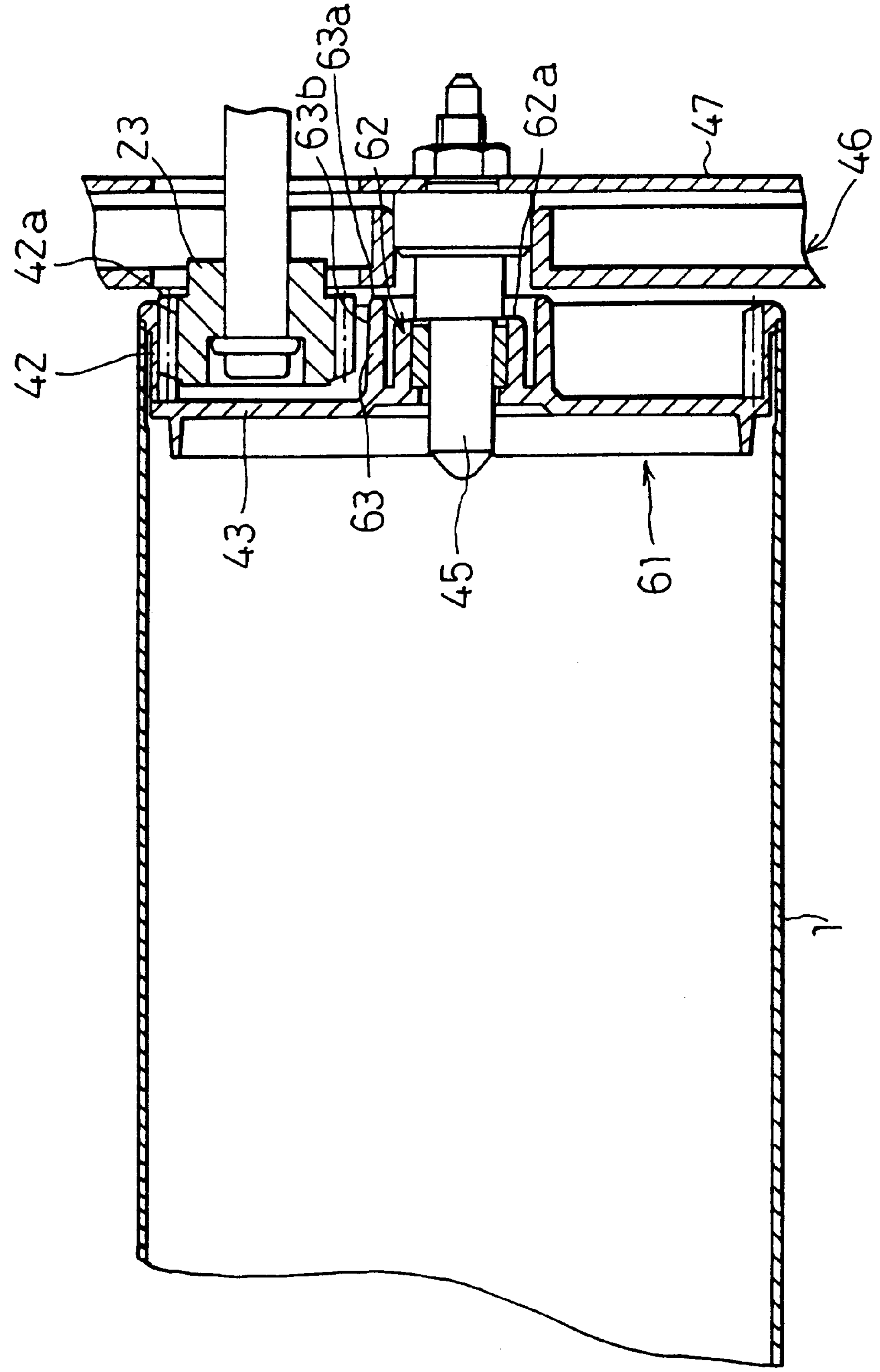
FIG. 15 is a cross-sectional view showing another structure of the photoreceptor unit shown in FIG. 14.

As shown in FIG. 15, an internal gear unit 61 in a photoreceptor unit in accordance with the present embodiment includes an internal gear member 42, a gear support member 43 and a shaft bearing member 62 centrally situated in the gear support member 43 as in the case of the previous embodiment. Here, the outer end portion 62a in the shaft direction of the shaft bearing member 62 is located in the inside in the shaft direction with respect to the outer end portion 42a of the internal gear member 42.

In the described arrangement of the present embodiment, a cover member 63 which covers the circumference of the bearing member 62 is formed between the bearing member 62 and the internal gear member 42. The cover member 63 is formed in a cylindrical shape so as to be projected to the outside in the shaft direction with respect to the gear support member 43 and is formed so as to extend in the shaft direction with respect to the internal gear member 42.

By forming such cover member 63, in the photoreceptor unit of the present embodiment, as the foreign substances drop only on a circumferential wall 63b of the cover member 63, and will not enter a space between the bearing member 62 and the shaft 45. Thus, as in the aforementioned case, an increase in frictional resistance between the bearing member 62 and the shaft 45, the damage of the bearing member 62, an unstable rotary motion of the photoreceptor drum 1, the shaking, locking thereof, or an increase in load during its rotations caused by the damage of the bearing member 44 can be prevented.

According to the photoreceptor unit in accordance with the present embodiment, even if foreign substances drop, only the circumferential wall 63*b* of the cover member 63 would be contaminated, and such foreign substances would not adhere directly onto the bearing member 62. As a result, entering of the foreign substances in a space between the bearing member 62 and the shaft 45 can be surely prevented.

Additionally, as the cover member 63 is formed on the internal gear unit 61, the described effect can be achieved with ease only by altering the structural design of the internal gear unit 61.

In the described preferred embodiment, the cover member 63 is formed on the internal gear unit 61; however, the present invention is not limited to this arrangement. For example, the cover member 63 may be formed so as to be projected toward the photoreceptor drum 1 from the process frame 46 or the main body frame 47.

Figure 16:
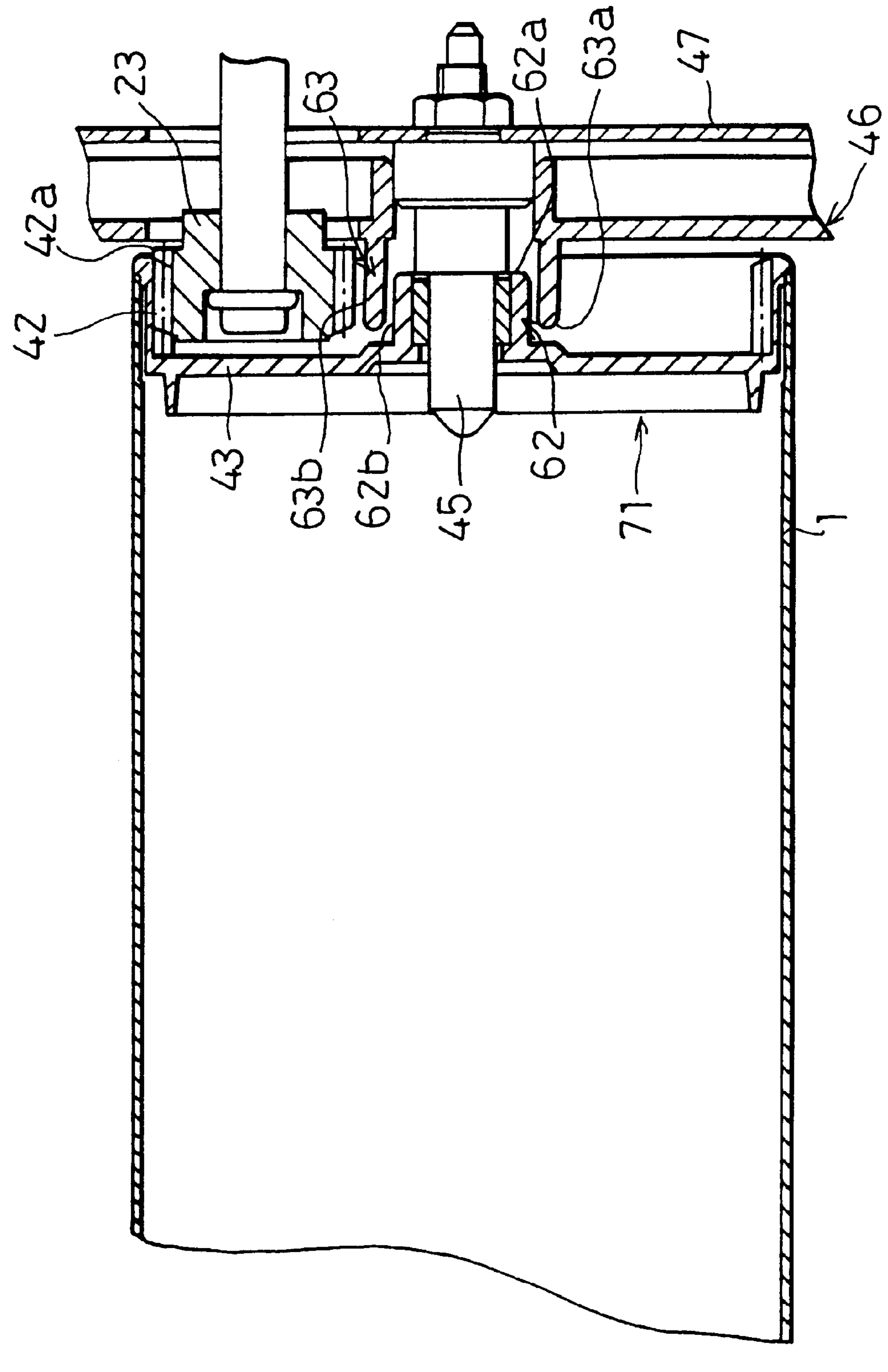
FIG. 16 is a cross-sectional view showing still another structure of the photoreceptor unit shown in FIG. 14.

For example, in the arrangement illustrated in FIG. 16, the outer end portion 62*a* of the bearing member 62 in the internal gear unit 71 is positioned to the inside in the shaft direction with respect to the outer end portion 42*a* of the internal gear member 42. Further, the cylindrical cover member 63 which extends towards the internal gear unit 71 from the process frame 46 covers the circumferential wall 62*b* of the bearing member 62 at least the outer end portion 62*a* of the bearing member 62.

In the present embodiment, the process frame 46 suggests the frame portion of the photoreceptor drum or the frame portion of a process unit composed of integrally formed photoreceptor drum 1 and process elements required for executing the image forming process, namely formed in a cartridge form. Therefore, the photoreceptor drum 1 is exchanged together with the process frame 46.

By forming such cover member 63, in the photoreceptor unit of the present embodiment, the foreign substances drop only on the circumferential wall 62*b* of the cover member 63, and will not enter a space between the bearing member 62 and the shaft 45.

The structure shown in FIG. 16 is provided for covering the members on the process frame 46 side, or the main body frame 47 side, for example, for covering the outer end portion 62*a* of the bearing member 62 by the cover member 63. For example, as shown in FIG. 1, the outer end portion 62*a* of the bearing member 62 may be covered by the members (not shown) which constitute the process frame 46 or the main body frame 47.

A still another embodiment of the present invention will be described in reference to FIG. 17 through FIG. 22. For convenience, members having the same function as the aforementioned embodiment will be designated by the same reference numerals, and thus the descriptions thereof shall be omitted here.

A photoreceptor unit of the present embodiment is provided in a copying machine shown in FIG. 12. In the copying machine, a copying operation is performed in the aforementioned manner. In the copying operation, an attraction force is exerted between a sheet having transferred thereon a toner image and the photoreceptor drum 1. In the arrangement of the present embodiment, the separation charger 6 applies an AC corona on the sheet so as to lower the potential of the sheet to the same level as the surface of the photoreceptor drum 1. As a result, the attraction force disappears, and the sheet is removed from the surface of the photoreceptor drum 1 by its rigidity and the separating member (not shown). The residual potential remaining on the photoreceptor drum 1 is removed by lowering the electrical resistance of the photoconductive layer by projecting a light beam from the discharge lamp 8. In addition, the respective members for use in forming an image are controlled by a control unit 13.

Figure 17:
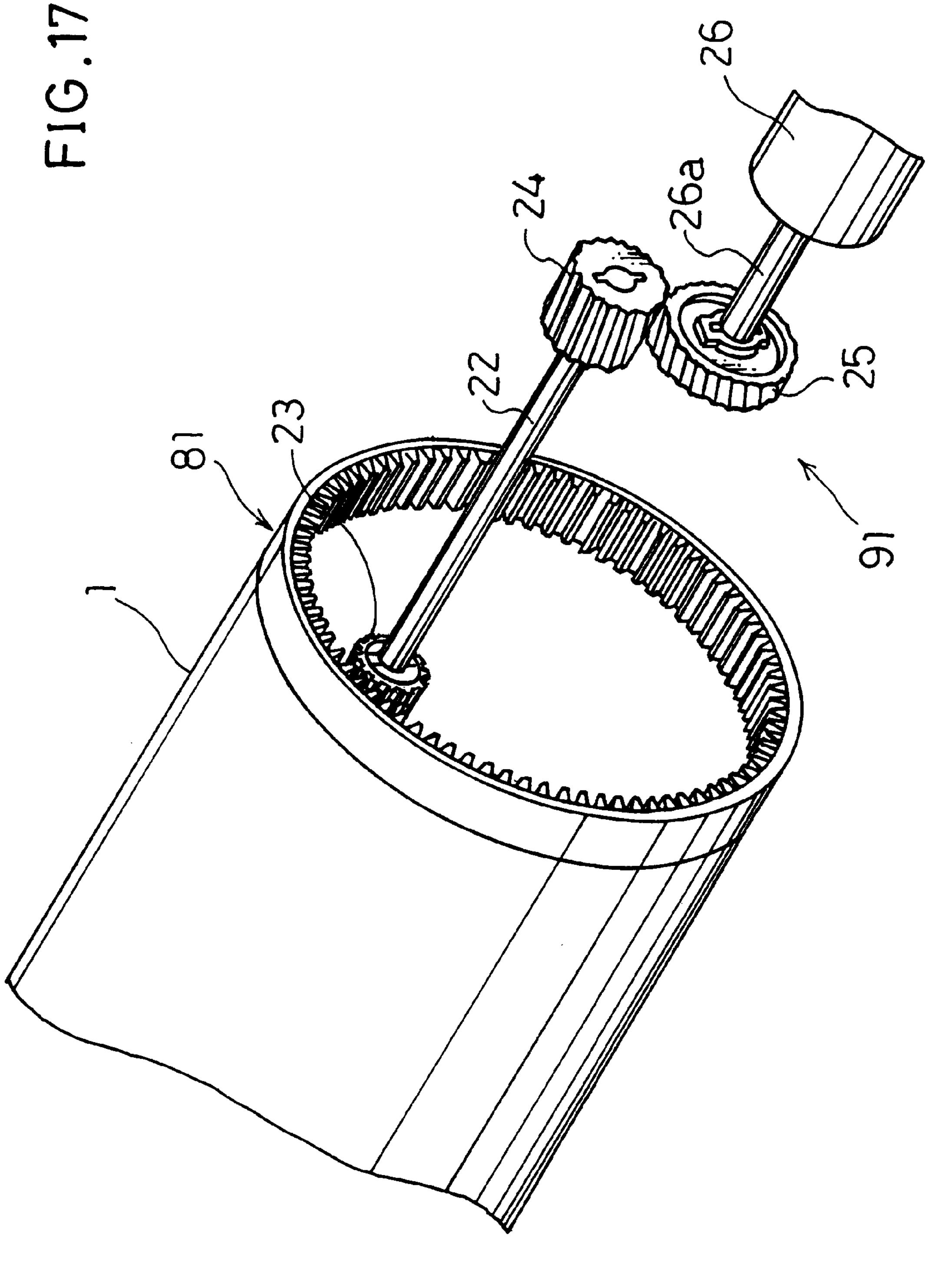
FIG. 17 is a perspective view showing a structure of a drive system of a photoreceptor drum in accordance with still another embodiment of the present invention.

As shown in FIG. 17, an internal gear unit 81 is formed at the back end portion of the photoreceptor drum 1 so as to be fitted by the press-fitting and bonded thereto. The photoreceptor unit of the present embodiment is composed of the photoreceptor drum 1, the internal gear unit 81 and a drive unit 91. The drive unit 91 is composed of a pinion gear 23, a gear 24, a gear 25 and a drive motor 26.

Figure 18:
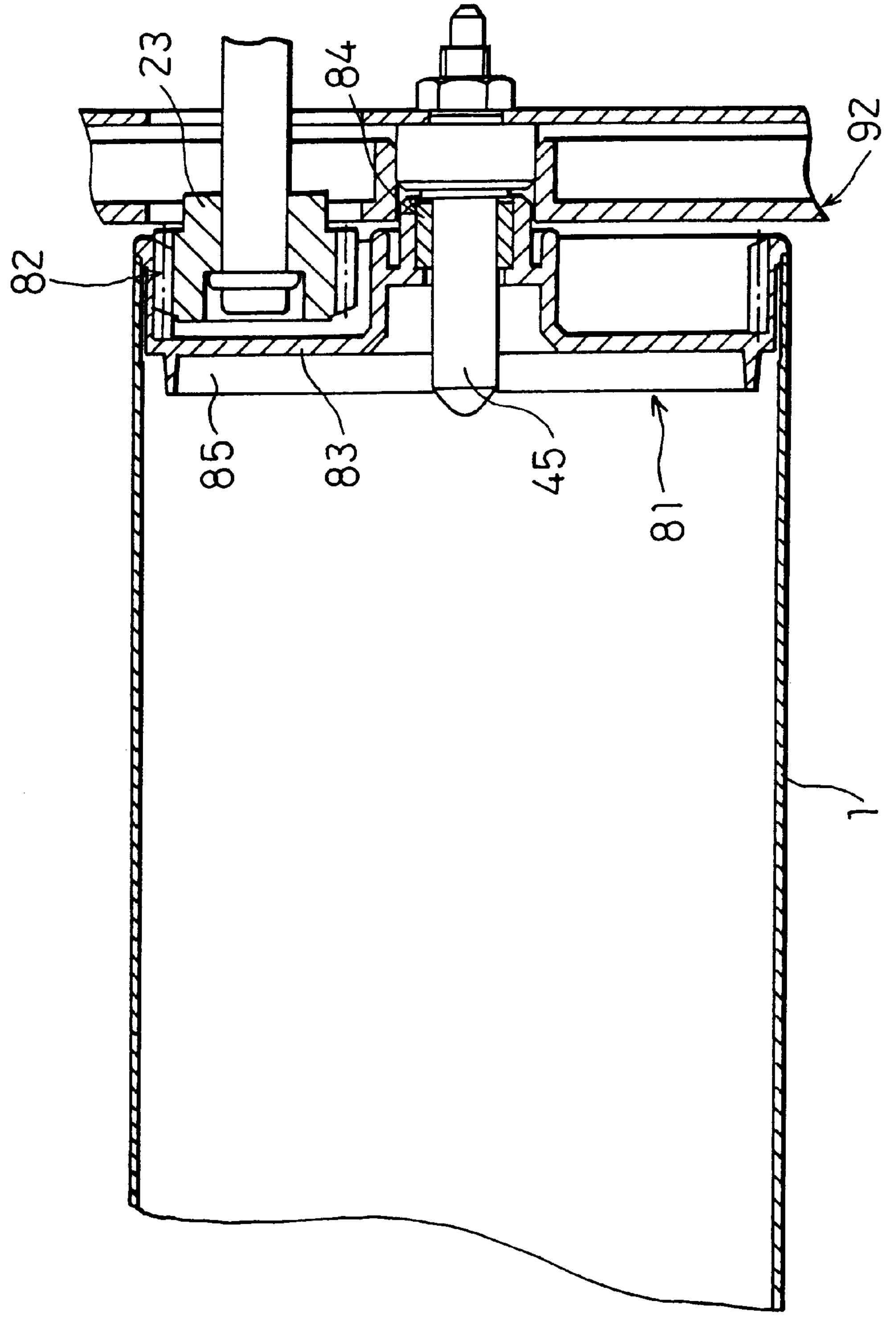
FIG. 18 is a cross-sectional view showing a structure of the photoreceptor unit of FIG. 17.
Figure 19:
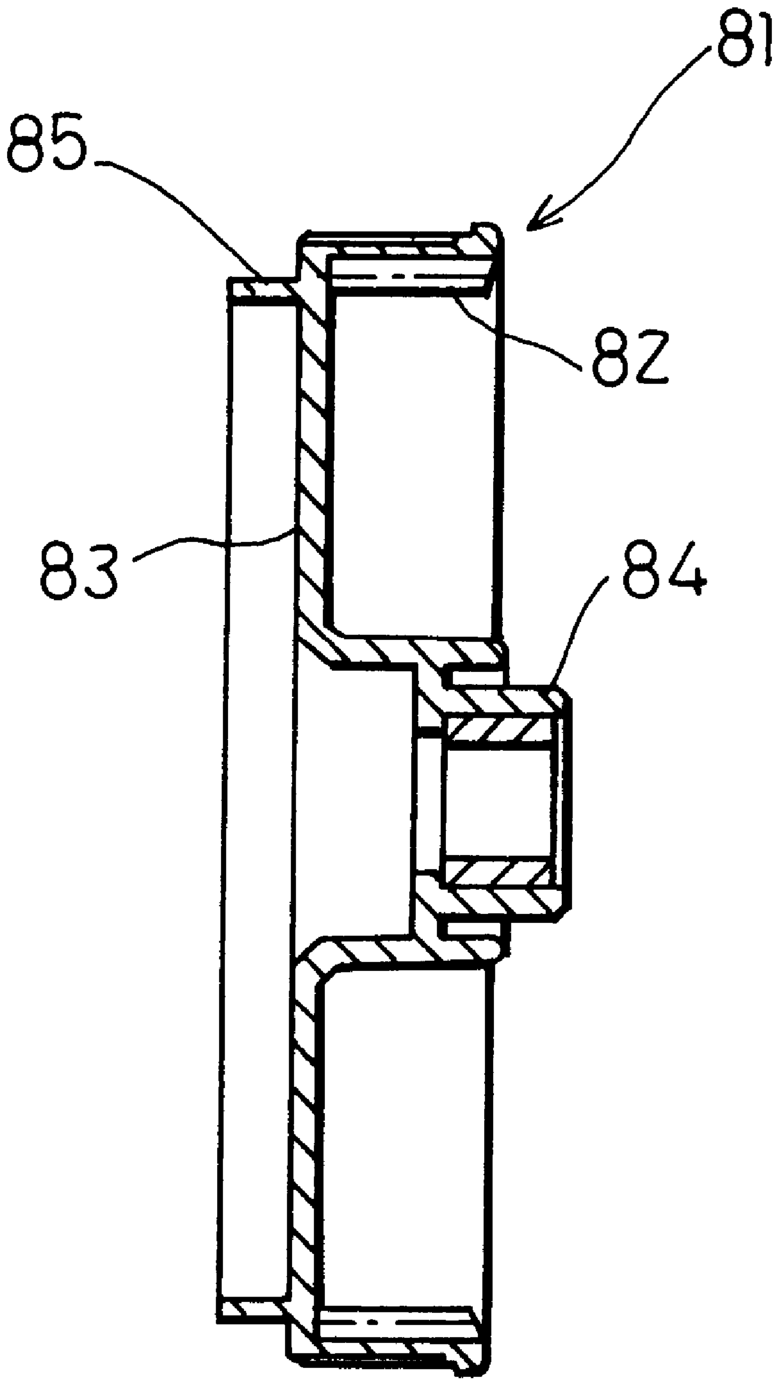
FIG. 19 is a cross-sectional view showing a structure of the internal gear unit of FIG. 18.

As shown in FIGS. 18 and 19, the internal gear unit 81 includes an internal gear member 82, a gear support member 83 including a face perpendicular to the shaft of the photoreceptor drum 1 for supporting the internal gear member 82, a bearing member 84 centrally situated in the gear support member 83 and a reinforcing member 85. Both the internal gear member 82 and the bearing member 84 are outwardly projected in the axial direction of the photoreceptor drum 1 to the inside with respect to the gear support member 83.

Figure 20:
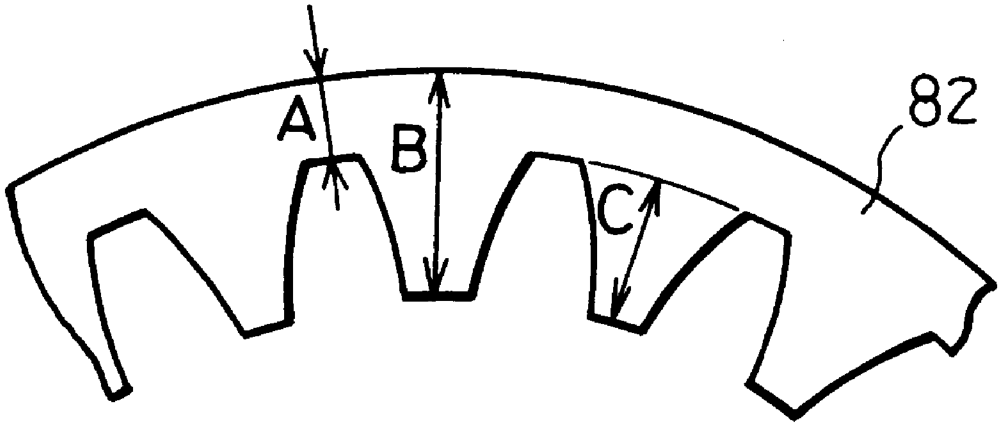
FIG. 20 is an enlarged view showing a structure of an internal gear unit of FIG. 19.

The internal gear member 82 is, for example, structured so as to have a module of 1 mm, a tooth width of 10 mm and a number of teeth of 73, and as shown in FIG. 20, a length A=1.45 mm, a length B=3.7 mm, a length C=2.25 mm and an average thickness=2 mm. In general, irrespectively of the spur gear or the internal gear, in the case of the resin gear with a module of 1 mm which is typically used in the office automation apparatuses, the condition of the length A being around 75 percent of the average thickness is preferable as it offers the optimal balance of strength and precision. Thus, such described condition is adopted in the present embodiment.

As shown in FIG. 18, the shaft 45 of the photoreceptor drum 1 is fitted in the bearing member 84. The shaft 45 is fixed to the drum shaft support member 92. The drum shaft support member 92 is formed on the outside in the shaft direction of the photoreceptor drum 1 and is fixed to the main body of the copying machine.

As shown also in FIG. 19, the reinforcing member 85 is formed so as to prevent the deformation of the internal gear member 82 to the center of the internal gear unit 81. The reinforcing member 85 is formed along the circumference of the internal gear member 82 in the cylindrical shape having an insignificantly smaller diameter than that of the internal gear member 82 and is projected from the back surface of the gear support member 83. To prevent a delay in the hardening process caused by completing the cooling process at an early stage, the free end of the reinforcing member 85 is made still thinner, and the leading end thereof is made thinner than the average thickness of the internal gear member 82. A connecting part of the reinforcing member 85 with the gear support member 83 and the connecting part of the internal gear member 82 with the gear support member 83 are overlapped in the axial direction of the internal gear member 82. The described internal gear unit 81 is formed, for example, by the resin molding such as an injection molding using a metal mold.

According to the described arrangement, during the cooling process in the manufacturing process of the internal gear unit 81, the deformation of the free end of the internal gear member 82 perpendicular to the gear support member 83 towards the center of the internal gear unit 81 can be prevented for the following mechanism. Here, there is no special reason for forming the reinforcing member 85 first as a separate member from the gear support member 83, and then mounting the reinforcing member 85 on the gear support member 83.

As the internal gear member 82 of the internal gear unit 81 is formed thick, the cooling process delays in the manufacturing process of the internal gear unit 81. As a result, the internal gear member 82 shrinks as being hardened and falls down towards the center of the internal gear unit 81. On the other hand, the leading end on the free end side of the reinforcing member 85 is hardened in an early stage as being formed thinner than the average thickness of the internal gear member 82.

Figure 21:
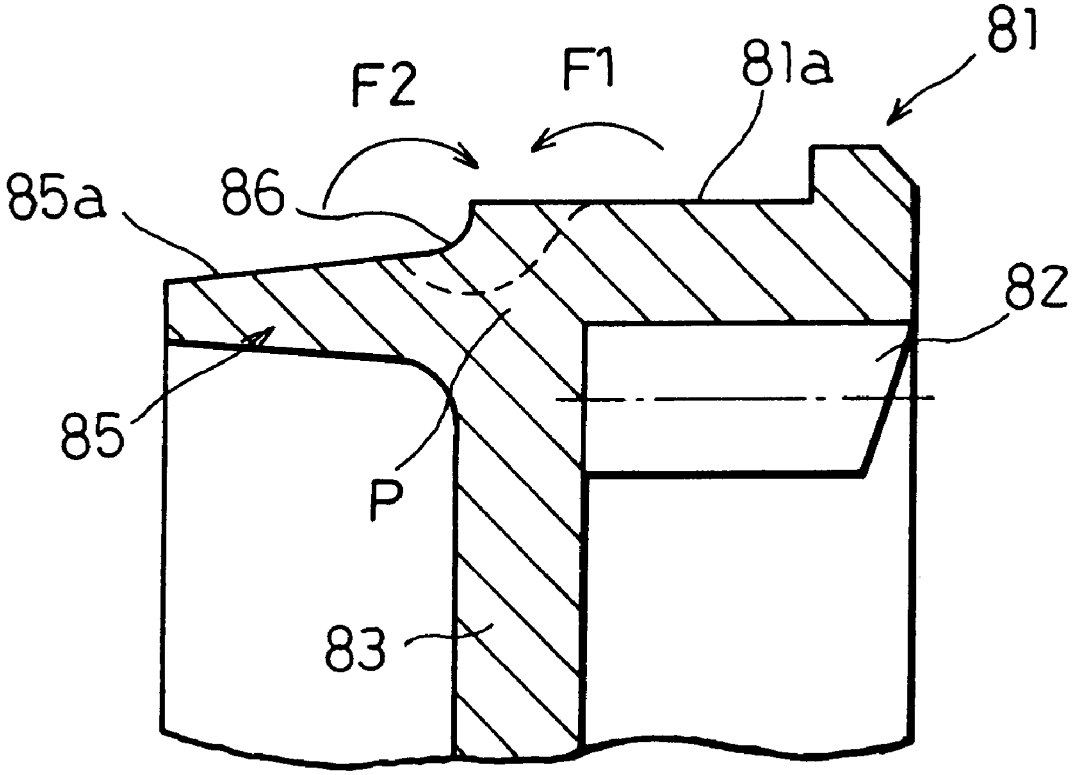
FIG. 21 is an enlarged cross-sectional view showing a structure of reinforcing member in detail of the internal gear unit of FIG. 19.
Figure 22:
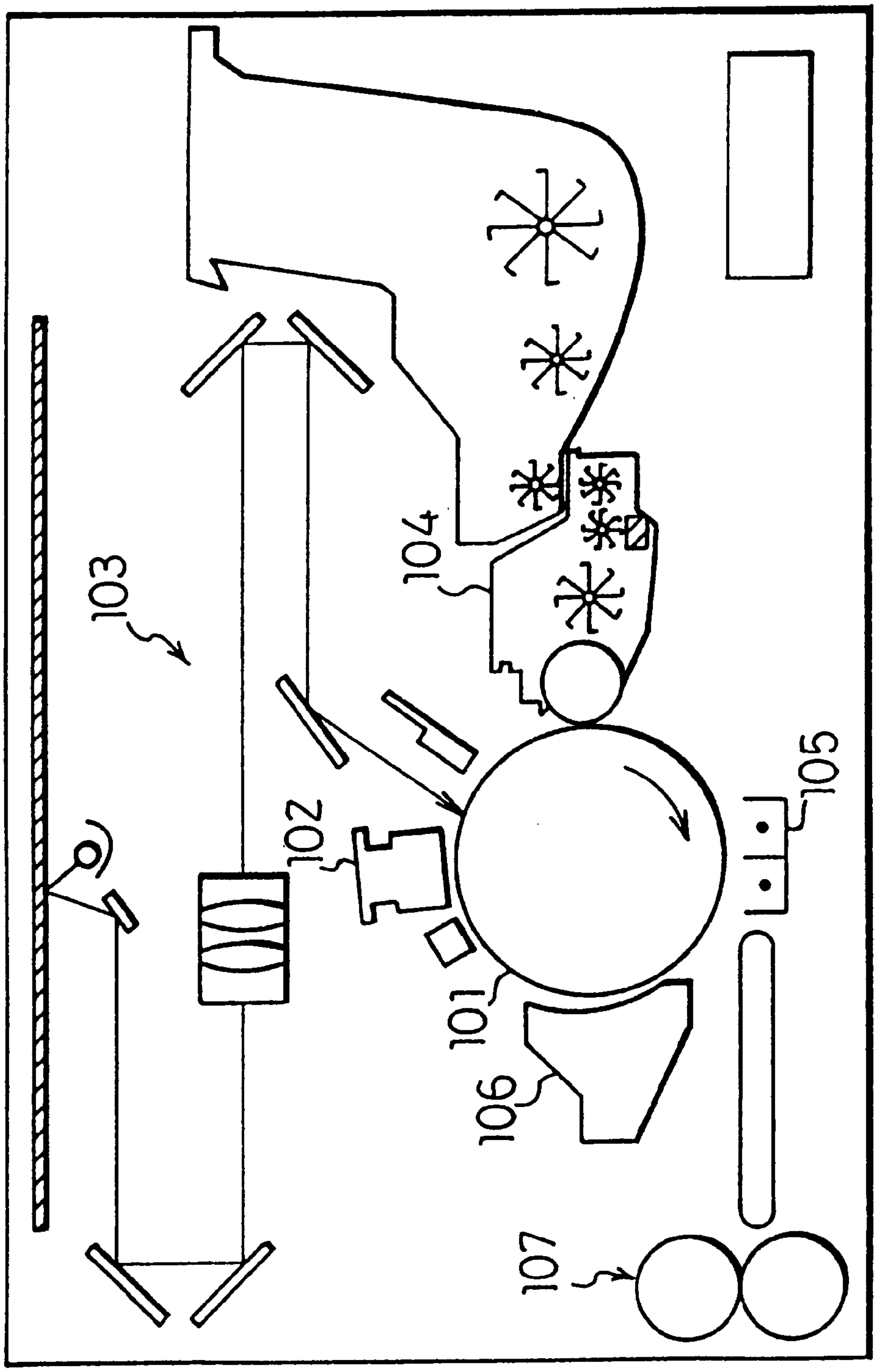
FIG. 22 CONVENTIONAL ART
FIG. 22 is a view showing an entire structure of a conventional copying machine provided with a photoreceptor unit.
Figure 23:
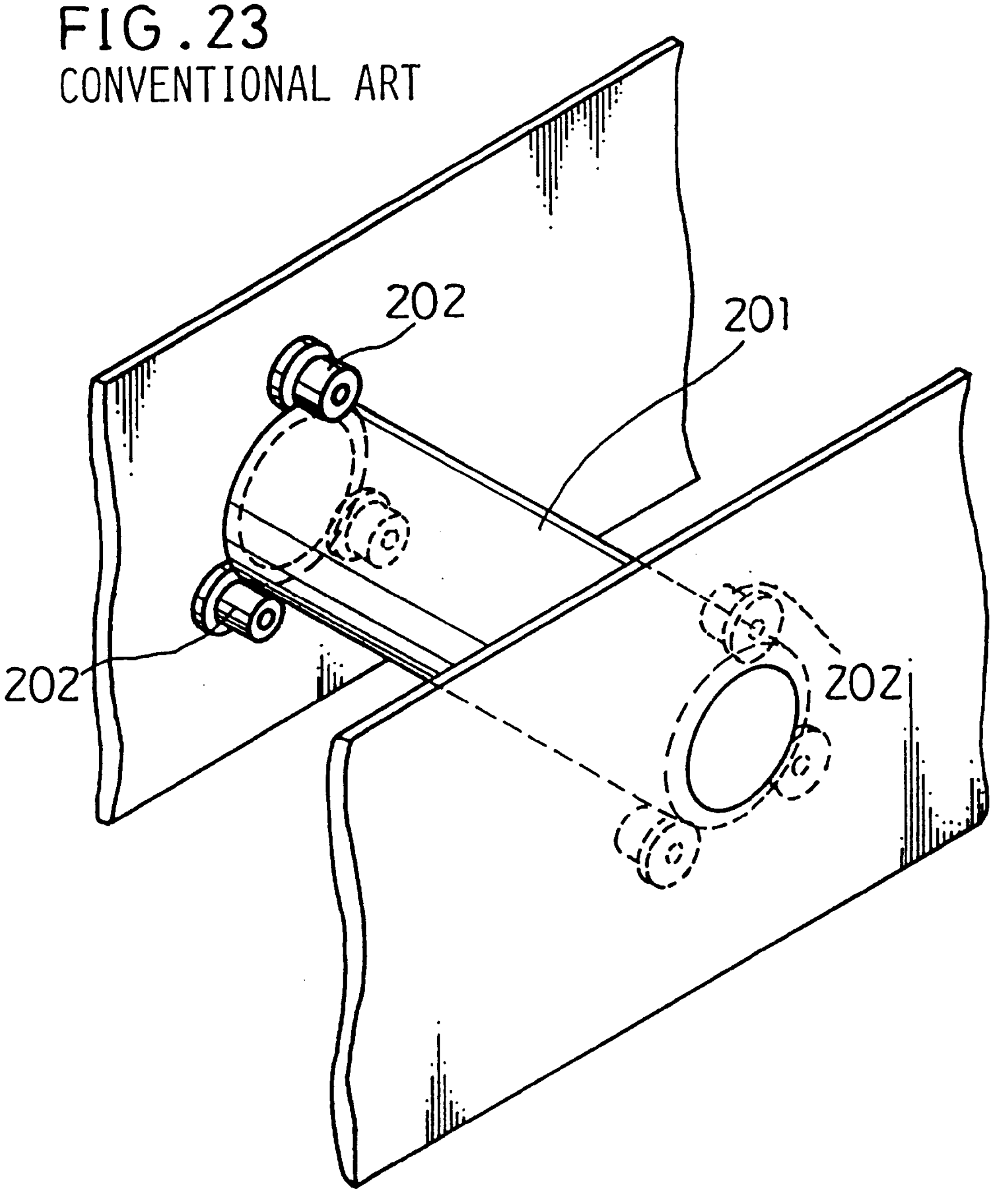
FIG. 23 CONVENTIONAL ART
FIG. 23 is a perspective view showing a structure of a conventional photoreceptor unit.
Figure 24:
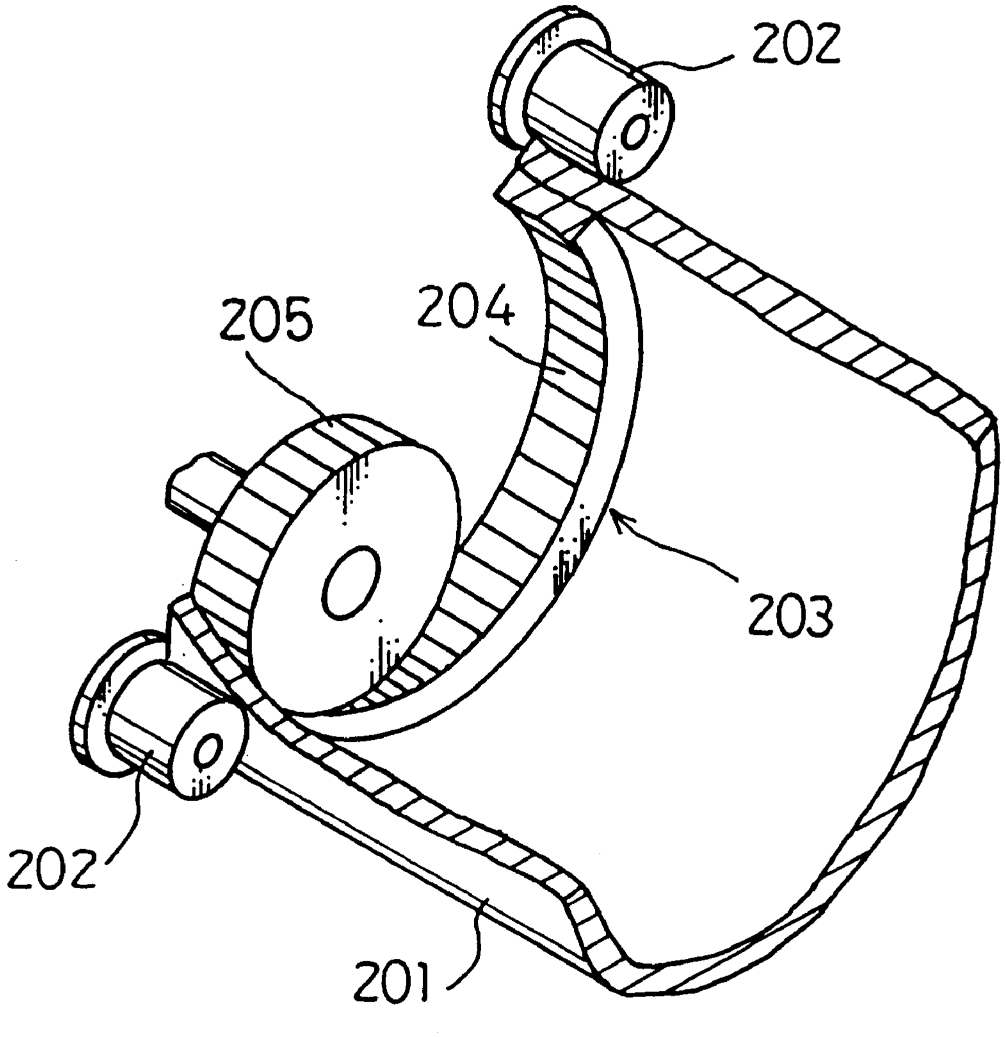
FIG.24 CONVENTIONAL ART
FIG. 24 is a perspective view showing an essential parts of an internal structure of a photoreceptor unit shown in FIG. 23.
Figure 25:
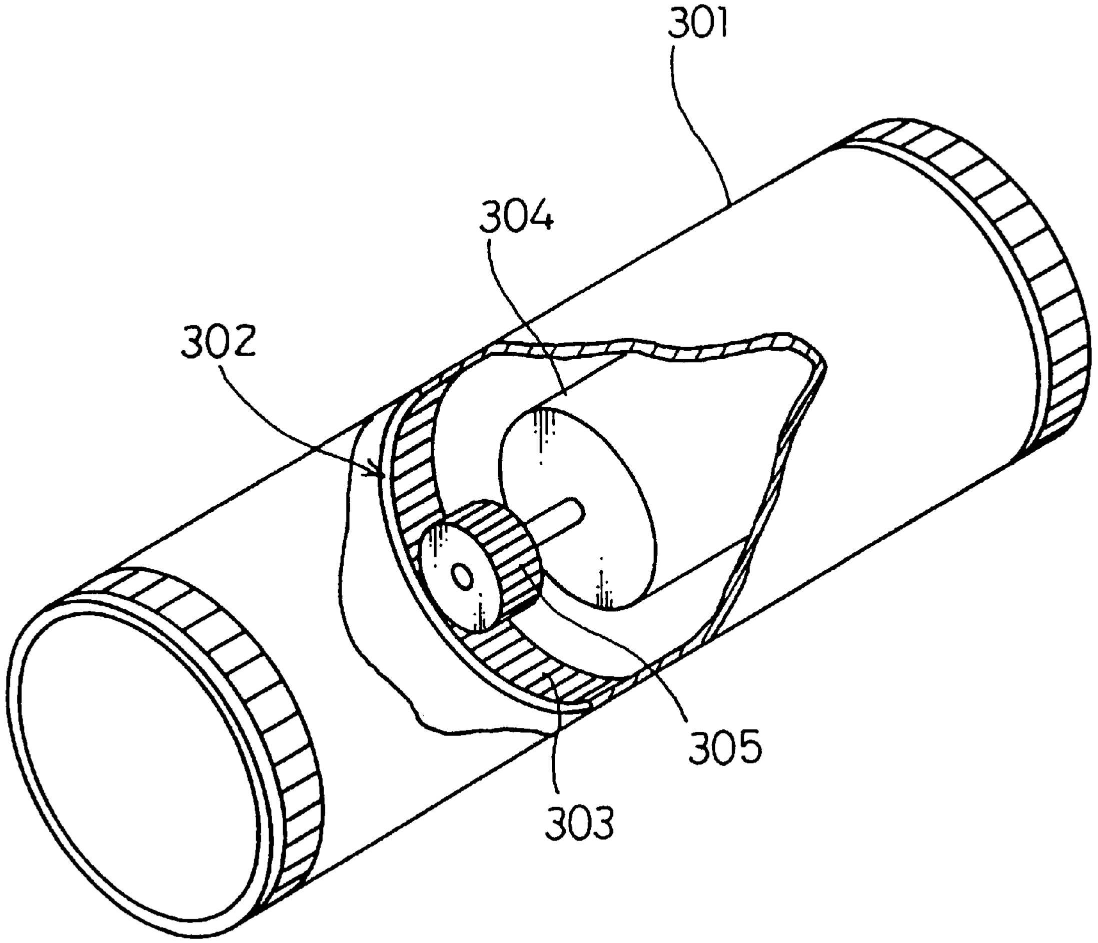
FIG.25 CONVENTIONAL ART
FIG. 25 is a perspective view showing an internal structure of another conventional photoreceptor unit with certain parts cut away.
Figure 26:
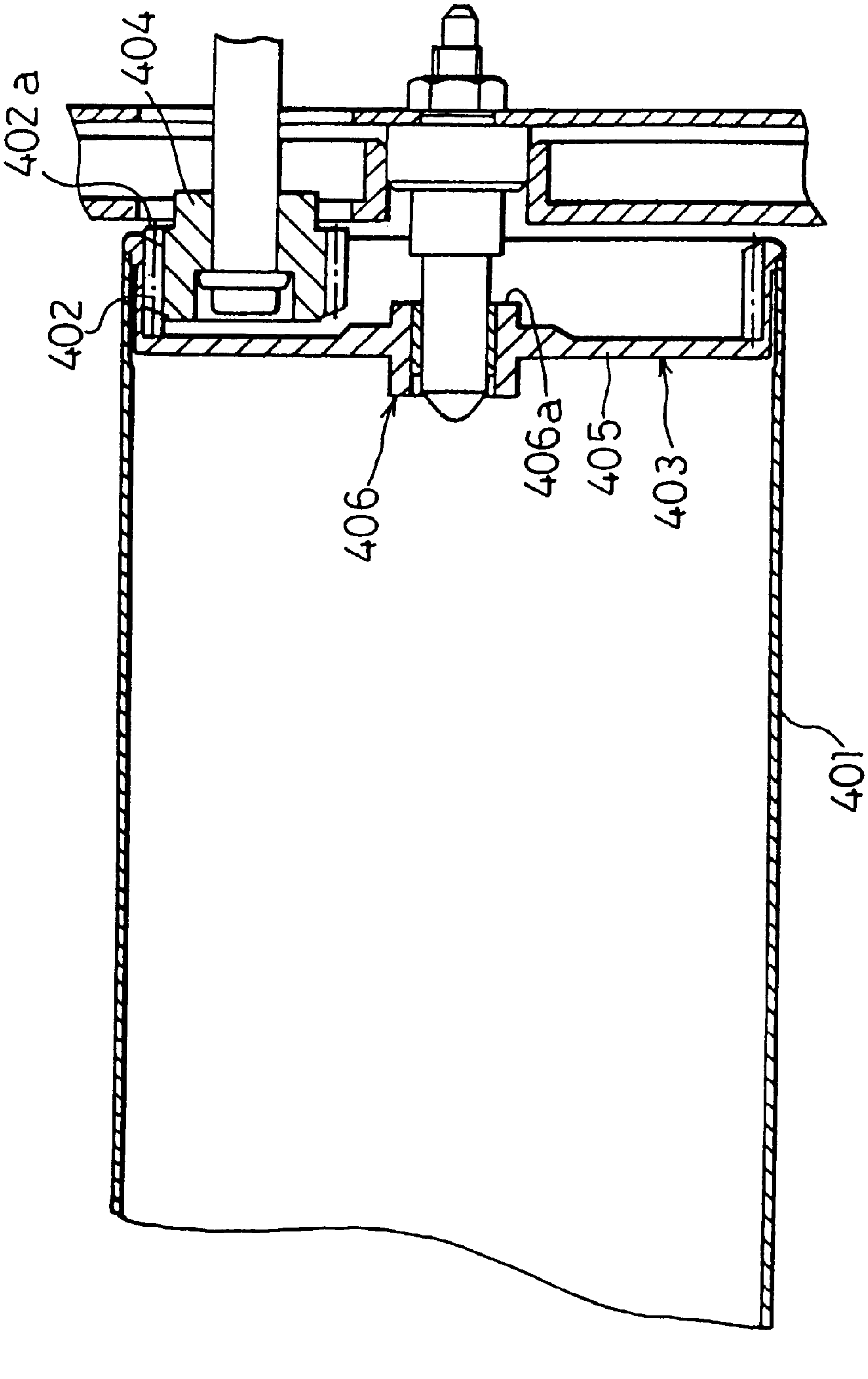
FIG.26 CONVENTIONAL ART
FIG. 26 is a cross-sectional view showing a structure of still another conventional photoreceptor unit.
Figure 27:
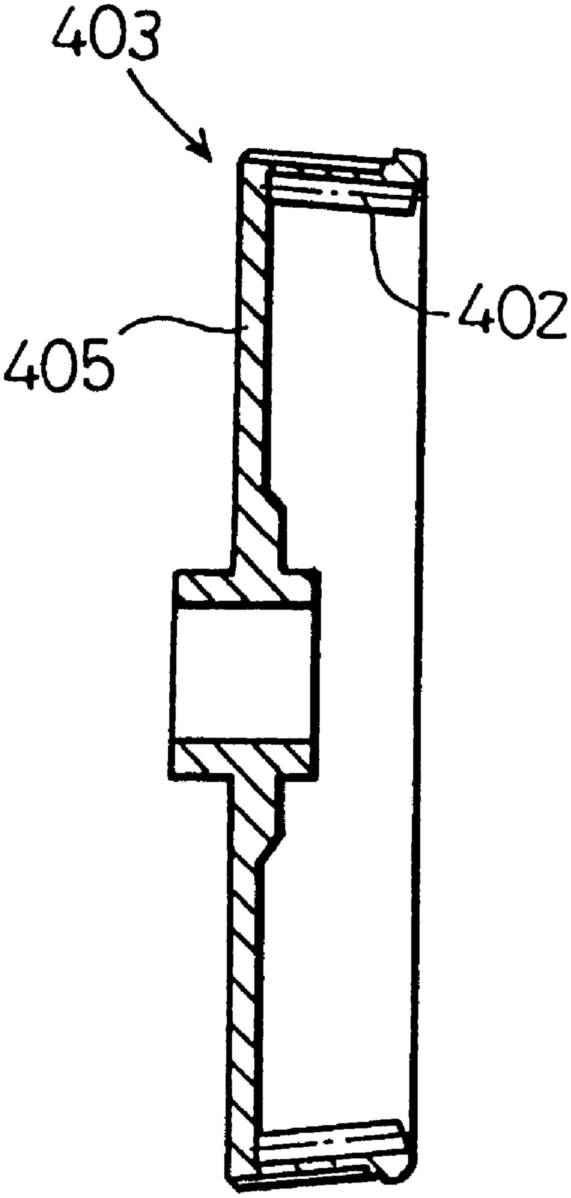
FIG.27 CONVENTIONAL ART
FIG. 27 is a cross-sectional view showing a state where an internal gear member of an internal gear unit shown in FIG. 26 is deformed.
Figure 28A:
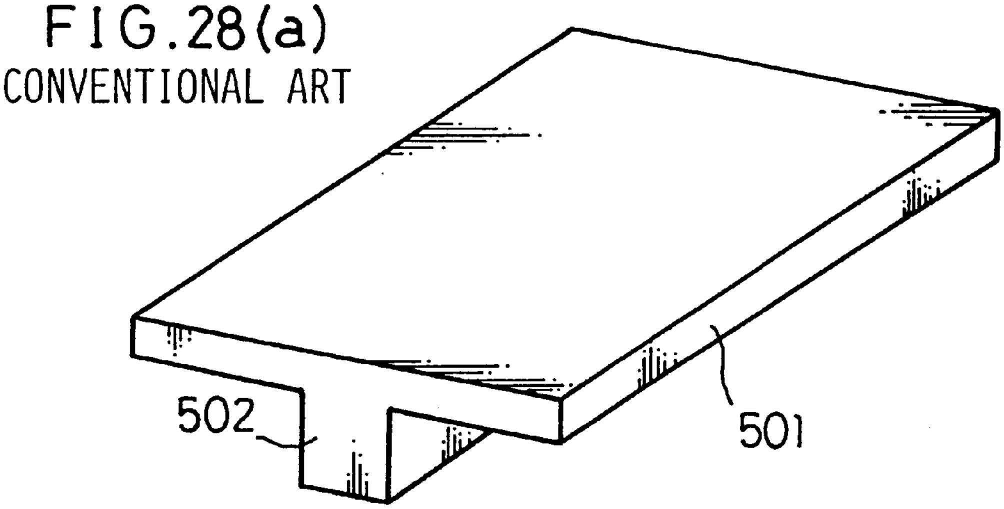
FIG.28(a) CONVENTIONAL ART
FIG. 28(*a*) is a perspective view of members which are related to the deformation of the internal gear member shown in FIG. 27.
Figure 28B:
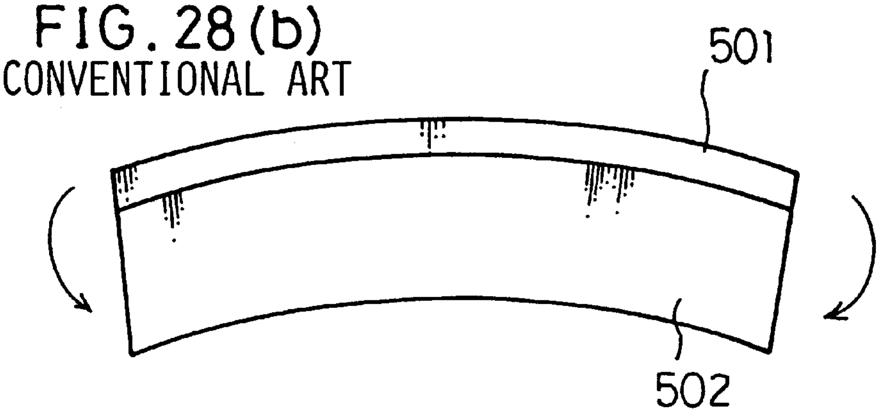
FIG.28(b) CONVENTIONAL ART

By forming such reinforcing member 85, the circumference of the internal gear unit 81 has a cross-section of substantial T-shape as shown in FIG. 21, and thus the thick portion P having a low cooling efficiency is inevitably formed. As such thick portion P has a slower cooling process than other portions, a shrinkage occurs as shown by the dotted line, and in the meantime, applied internal stress F1, F2 generate in a vicinity of the shrinkage as shown in the figure.

Thus, in the internal gear member 82, the force in a direction of falling the internal gear member 82 down and the applied internal stress F1 are exerted in opposite directions, and thus such falling down of the internal gear member 82 can be suppressed. In this case, as the reinforcing member 85 serves as the support member against the internal stress F2, the internal stress F1 urges the internal gear member 82 so as to prevent the wall shown of the internal gear member 82 with ease. For the described mechanism, the internal gear member 82 can be maintained substantially perpendicular to the gear support member 83.

As can be seen, by forming the reinforcing member 85 in a vicinity of a circumference of the internal gear unit 81, and in the cylindrical shape, an excellent anti-deformation effect can be achieved.

Additionally, in the present embodiment, a level difference 86 is formed between the circumferential surface 81*a* corresponding to the internal gear member 82 of the internal gear unit 81 and an circumferential surface 85*a* of the reinforcing member 85. Namely, the outside diameter of the reinforcing member 85 is selected to be smaller than the outside diameter of the internal gear member 82 for the following reason. That is, as the circumferential surface 81*a* serves as the press fitting part to the photoreceptor drum 1, if the circumferential surface 85*a* of the reinforcing member 85 were formed on the same level as the circumferential surface 81*a* of the internal gear unit 81, the press fitting part would become too long. Thus, such condition is unpreferable. Namely, the press fitting part of the photoreceptor drum 1 is formed in the following manner. After forming the photoreceptor drum 1 in a cylindrical shape, the inner end portion of the photoreceptor drum 1 for fitting therein the internal gear unit 81 is finished. Thus, the shorter is the finishing width, i.e., the press fitting part, the more is preferable as the finishing can be performed with ease. Therefore, the described arrangement permits a reduction in the number of processes required for manufacturing the photoreceptor unit and a reduction in the manufacturing cost thereof.

According to the photoreceptor unit having the described arrangement, when the drive motor 26 of the drive unit 91 is activated, the drive force is transmitted to the internal gear member 82 of the internal gear unit 81 from the pinion gear 23. As a result, the photoreceptor drum 1 rotates about the shaft 45. Here, as the internal gear member 82 is positioned perpendicular to the gear support member 83, the pinion gear 23 and the internal gear member 82 are in engagement with one another with an improved accuracy, thereby smoothly rotating the photoreceptor drum 1.

Additionally, in the photoreceptor unit of the present embodiment, the internal gear unit 81 is fitted to the end portion of the photoreceptor drum 1. Thus, an unstable rotary motion of the photoreceptor drum 1, the shaking and locking thereof, or an increase in load during its rotations can be prevented.

As a result of the investigation on the described effect, the deformation of the leading end of the internal gear member 82 is in a range of 50 to 80 μm without the reinforcing member 85, while in a range of −10 to 20 μm with the reinforcing member 85, and a desirable engagement between the internal gear member 82 and the pinion gear 23 can be achieved during their rotations.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. A photoreceptor unit with an internal gear, comprising:

a photoreceptor drum; and an internal gear unit fitted in said photoreceptor drum, for actuating a rotary motion thereof, wherein said internal gear unit includes an internal gear member, a gear support member formed on a face perpendicular to an axial direction of said photoreceptor drum, for supporting said internal gear member, and a bearing member formed at a center of said gear support member, said internal gear member and said bearing member are formed so as to be projected in an axial direction of said photoreceptor drum to an outside with respect to said gear support member, and an outer end portion in an axial direction of said bearing member extends in the axial direction to an outside with respect to said internal gear member.

2. The photoreceptor unit with an internal gear as defined in claim 1, wherein:

said photoreceptor drum is formed in a cylindrical shape, and said internal gear unit is fitted into an inner circumference of said photoreceptor drum.

3. The photoreceptor unit with an internal gear, comprising:

a photoreceptor drum; and an internal gear unit fitted in said photoreceptor drum, for actuating a rotary motion thereof, wherein said internal gear unit includes an internal gear member, a gear support member formed on a face perpendicular to an axial direction of said photoreceptor drum, for supporting said internal gear member, and a bearing member centrally situated in said gear support member, and a cover member, formed between said bearing member and said internal gear member, for covering a circumference of said bearing member, said internal gear member and said bearing member are formed so as to be projected in an axial direction of said photoreceptor drum to an outside with respect to said gear support member, said cover member is formed so as to be projected in the axial direction of said photoreceptor drum to an outside with respect to said gear support member, and an outer end portion in an axial direction of said photoreceptor drum extends in the axial direction of said photoreceptor drum to an outside with respect to said internal gear member.

4. The photoreceptor unit with an internal gear as defined in claim 3, wherein:

said photoreceptor drum is formed in a cylindrical shape, and said internal gear unit is fitted in an inner circumference of said photoreceptor drum.

5. A photoreceptor unit with an internal gear, comprising:

a photoreceptor drum;

an internal gear unit fitted in said photoreceptor drum, for actuating a rotary motion thereof; and a cover member formed on a member on a main body side for installing thereon said photoreceptor drum, said cover member being formed in an axial direction of said photoreceptor drum, wherein said internal gear unit includes an internal gear member, a gear support member formed on a face perpendicular in an axial direction of said photoreceptor drum, for supporting said internal gear member, and a bearing member centrally situated in said gear support member, said internal gear member and said bearing member are formed so as to be projected in an axial direction of said photoreceptor drum to said gear support member side, and said cover member is provided so as to cover a circumference of said bearing member.

6. The photoreceptor unit with an internal gear as defined in claim 5, wherein:

said cover member is formed so as to be projected in an axial direction of said photoreceptor drum to an outside of said internal gear unit from said member on the main body side.

7. The photoreceptor unit with an internal gear as defined in claim 5, wherein:

said photoreceptor drum is formed in a cylindrical shape; and said internal gear unit is fitted in an inner circumference of said photoreceptor drum.

8. The photoreceptor unit with an internal gear as defined in claim 5, wherein:

said member on the main body side is a drum axis support member for supporting an axis of said photoreceptor drum, said drum axis support member being provided in an axial direction of said photoreceptor drum on the outside of said internal gear unit.

9. A photoreceptor unit with an internal gear, comprising:

a photoreceptor drum; and an internal gear unit, provided at one end portion of said photoreceptor drum, wherein said internal gear unit includes a cylindrical internal gear member, a disk member formed at one end portion in a widthwise direction of said internal gear member, and a reinforcement member formed in a vicinity of an outer circumference of a face opposite to said internal gear member of said disk member, for preventing a free end of said internal gear member from being deformed towards a center of said internal gear member, and said reinforcing member is formed in a cylindrical shape in such a manner that it is projected from said disk member to an opposite direction to a direction of said internal gear member, and that a projected leading end portion is formed thinner than an average thickness of said internal gear member.

* * * * *